(12) United States Patent
Suzuki et al.

(10) Patent No.: US 7,138,453 B1
(45) Date of Patent: Nov. 21, 2006

(54) THERMOPLASTIC RESIN COMPOSITION AND PROCESS FOR PREPARING THE SAME

(75) Inventors: Noriyuki Suzuki, Settsu (JP); Tomoya Noma, Settsu (JP); Mitsuharu Kourogi, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,260

(22) PCT Filed: Apr. 4, 2000

(86) PCT No.: PCT/JP00/02166

§ 371 (c)(1),
(2), (4) Date: Oct. 3, 2001

(87) PCT Pub. No.: WO00/60006

PCT Pub. Date: Oct. 12, 2000

(30) Foreign Application Priority Data

| Apr. 5, 1999 | (JP) | ................................ 11-097272 |
| Apr. 22, 1999 | (JP) | ................................ 11-114850 |
| May 10, 1999 | (JP) | ................................ 11-128251 |

(51) Int. Cl.
*C08K 3/34* (2006.01)
*C08K 9/04* (2006.01)

(52) U.S. Cl. ...................... 524/446; 524/445; 524/447; 523/200; 523/216

(58) Field of Classification Search ................ 524/445, 524/446, 447, 449; 523/200, 210; 501/145, 501/147

See application file for complete search history.

(56) References Cited

U.S. PATENT DOCUMENTS

| 4,889,885 A | | 12/1989 | Usuki et al. | |
| 5,760,121 A | * | 6/1998 | Beall et al. | .................. 524/450 |
| 5,972,448 A | * | 10/1999 | Frisk et al. | ................. 428/35.7 |
| 6,034,163 A | * | 3/2000 | Barbee et al. | ............... 524/445 |
| 6,071,988 A | * | 6/2000 | Barbee et al. | ............... 523/210 |
| 6,084,019 A | * | 7/2000 | Matayabas, Jr. et al. | .... 524/445 |
| 6,162,857 A | * | 12/2000 | Trexler, Jr. et al. | ......... 524/445 |
| 6,337,046 B1 | * | 1/2002 | Bagrodia et al. | ........... 264/540 |
| 6,359,052 B1 | * | 3/2002 | Trexler, Jr. et al. | ......... 524/445 |

FOREIGN PATENT DOCUMENTS

| JP | 9-143359 | | 6/1997 |
| JP | 10-158431 | | 6/1998 |
| JP | 10-310420 | | 11/1998 |
| JP | 11-71509 | * | 3/1999 |
| WO | 98/29499 | | 7/1998 |
| WO | 99/23162 | | 5/1999 |

* cited by examiner

*Primary Examiner*—Te H. Yoon
(74) *Attorney, Agent, or Firm*—Armstrong, Kratz, Quintos, Hanson & Brooks, LLP

(57) ABSTRACT

There is provided a polyester resin composition excellent in mechanical properties, heat deformation temperature, surface appearance, dimensional stability and mold releasing ability, and a process for preparing the same. The polyester resin composition contains a thermoplastic polyester resin and layered phyllosilicate, wherein the layered phyllosilicate in the resin composition satisfies at least one of the following conditions (a) to (c):

(a) ratio of layered phyllosilicate having equivalent area circle diameter [D] of at most 3,000 Å is at least 20%;

(b) a mean value of equivalent area circle diameter [D] is at most 5000 Å;

(c) the number of particles [N] per unit ratio of layered phyllosilicate present in 100 $\mu m^2$ of a resin composition is at least 30.

1 Claim, 1 Drawing Sheet

THERMOPLASTIC RESIN COMPOSITION AND PROCESS FOR PREPARING THE SAME

TECHNICAL FIELD

The present invention relates to a thermoplastic resin composition containing a thermoplastic resin and layered phyllosilicate, and a process for preparing the above thermoplastic resin composition.

BACKGROUND ART

Thermoplastic polyester resins such as poly(ethylene terephthalate) are used for various industrial purposes in the form of fiber or film since they are excellent in heat resistance, chemical resistance, weatherability, mechanical properties, electric properties, molding flowability and the like. However, higher mechanical properties and heat resistance are further required. Attempts have been made to mix various fillers, examples of which are inorganic fiber such as glass fiber, carbon fiber and potassium titanate whisker, and inorganic particles such as glass flakes, glass beads, talc, mica and kaolin. Though mechanical properties and the like are actually improved by mixing the above inorganic materials, there is a problem that appearance is lost due to the emergence of fibrous reinforcements and specific gravity is increased. There is also a problem that anisotropy occurs due to orientation of inorganic fibers.

It is generally thought that these defects in mixing inorganic fiber and inorganic particles are caused by the fact that dispersion of inorganic materials is insufficient and dispersion particle size thereof is too large.

As an attempt to disperse layered phyllosilicate among inorganic materials into a thermoplastic resin, there is disclosed (1) invention relating to a resin composition containing a layered inorganic filler and a thermoplastic polyester resin, wherein the layered inorganic filler has 0.2 to 1.0 of a charge on the layers and basal space expanded at least five times the initial value (Japanese Unexamined Patent Publication No. 26123/1995). Specifically, the disclosed technology is such that swellable mica is used as layered phyllosilicate and that a polyester resin composition is obtained by polymerization after ester exchange reaction of ethylene glycol and dimethyl terephthalate in which the above mica is dispersed. However, a polyester resin composition having desired properties cannot be prepared according to the above invention.

In addition, there are disclosed (2) invention relating to a resin composition obtained by dispersing layered phyllosilicate in a crystalline thermoplastic resin as a crystalline nucleus at molecular level under aspect ratio of at least 20 (Japanese Unexamined Patent Publication No. 183910/1997); and (3) invention relating to a resin composition obtained by dispersing, in a thermoplastic resin, layered phyllosilicate having average layer thickness of 25 to 1,000 Å and aspect ratio of 20 to 200 (Japanese Unexamined Patent Publication No. 124836/1997). Specifically, the disclosed technology is such that swellable mica is used as layered phyllosilicate and that a resin composition is obtained by extruding swellable mica swelled in water or alkyl ammonium-treated swellable mica swelled in xylene with polypropylene or the like by using a twin-screw extruder. However, it was impossible to prepare a polyester resin composition having desired properties even by the above inventions.

The reason why a polyester resin composition having desired properties cannot be prepared by the above prior arts (1), (2) and (3) is insufficient dispersion of layered phyllosilicate. Though the basal space of swellable mica is actually expanded from the initial value, the layered phyllosilicate is not finely dispersed into the thermoplastic polyester resin but only in the state of coagulation according to the prior art (1). In addition, even if the prior arts (2) and (3) are directly applied to a thermoplastic polyester resin, dispersion of layered phyllosilicate is still incomplete and inhomogeneous though fine dispersion is partly observed.

Having excellent mechanical properties and heat resistance, reinforced polyester resins containing a thermoplastic polyester resin and a fibrous filler are used for various purposes including electronic or electric parts, exterior materials for automobiles, household electric appliances, mechanical or machinery parts and the like. However, there were problems with the above polyester resin such that dimensional accuracy of the obtained molded article significantly decreased due to orientation of the fibrous filler during injection molding. As a means for improving the above problems, processes for combining glass fiber with other inorganic fillers have been attempted. Examples thereof include (4) adding a non-fibrous inorganic substance to poly(ethylene terephthalate) and glass fiber (Japanese Unexamined Patent Publication No. 74852/1979); (5) combining fragmentized mineral fiber with poly(butylene terephthalate) and glass fiber (GF) (Japanese Unexamined Patent Publication No. 254655/1986); (6) combining mica with poly(ethylene terephthalate) and glass fiber (Japanese Unexamined Patent Publication No. 59661/1987); and the like.

However, the above prior arts (4) to (6) did not show sufficient improving effect on dimensional accuracy when the amount of the inorganic filler was small. On the contrary, when a large amount of the inorganic filler was used in order to improve dimensional accuracy, there arise different problems with increase in specific gravity, deterioration in appearance of a molded article, decrease in strength and the like.

It is thought that these defects in mixing the above inorganic filler are caused by the fact that dispersion of inorganic materials is insufficient and dispersion particle size thereof is too large. Though there are disclosed the above prior arts (1) to (3) as an attempt to finely disperse layered phyllosilicate out of organic materials into a thermoplastic resin, improvement effect on dimensional accuracy was insufficient even in the reinforced polyester resins because uniform dispersion of the layered phyllosilicate was impossible as mentioned above.

Besides, thermoplastic polyester resins have disadvantages of inferior impact resistance and dimensional stability though it shows the above characteristics. Meanwhile, aromatic polycarbonate resins are widely used, as thermoplastic resins excellent in heat resistance, impact resistance, toughness and the like, for parts of machines, automobiles, electric and electronic devices. However, relatively high processing temperature of about 300° C., high injection speed and high injection pressure are normally required for ensuring molding flowability. In addition, aromatic polycarbonate resins have problems with chemical resistance such that the surface of the molded article is cracked, deformed or dissolved due to various organic solvents or gasoline. There are also weatherability problems such as crack propagation and discoloration into yellow on the surface of the molded article in case of long exposure to ultraviolet ray.

In order to overcome these defects by making use of the respective features, resin compositions comprising a polyester resin and a polycarbonate resin are disclosed, for example, in Japanese Examined Patent Publication No. 14035/1961, Japanese Examined Patent Publication No. 20434/1964, Japanese Unexamined Patent Publication No. 176345/1984, Japanese Examined Patent Publication No. 94350/1980, Japanese Unexamined Patent Publication No. 83158/1988 and the like.

In case of forming a composition by mixing a polyester resin and a polycarbonate resin, impact resistance and dimensional stability of a polyester resin and molding flowability and chemical resistance of a polycarbonate resin are actually improved, but improvement effect on mechanical properties such as flexural modulus and heat resistance is insufficient. It is said that this is because crystallization of the polyester resin is prevented and crystallinity is lowered since the polycarbonate resin and the polyester resin are partly compatibilized or reacted with each other. Due to these phenomena, the obtained composition did not have satisfactory chemical resistance.

It has been attempted to promote crystallization of polyester resins for the purpose of improving mechanical properties and heat resistance. However, there was a problem that the polycarbonate resin is decomposed and foamed in case of using an organic carboxylate salt nuclear agent (Japanese Examined Patent Publication No. 29977/1971, Japanese Unexamined Patent Publication No. 158452/1979 and the like). Also, effects were insufficient in case of using an inorganic nuclear agent (Japanese Examined Patent Publication No. 38707/1971, Japanese Examined Patent Publication No. 27142/1972 and the like).

Though the above prior art (3) is disclosed as a different method, the layered phyllosilicate is not uniformly dispersed in the whole system but only in some part as mentioned above, making it impossible to obtain a resin composition having desired properties even if the thermoplastic resin composition contains a polycarbonate resin. In addition, when swellable mica treated with alkyl ammonium or the like is used, there arise other problems with lowering in properties and coloring due to deterioration of the polyester resin and the polycarbonate resin. Therefore, no technology is available yet at present as to obtaining a resin composition excellent in mechanical properties and heat resistance by finely dispersing layered phyllosilicate into a polyester resin and a polycarbonate resin.

An object of the present invention is to solve these conventional problems and to provide a thermoplastic resin composition and a process for preparing the thermoplastic resin composition, wherein mechanical properties, heat deformation temperature, dimensional stability and moldability are improved without losing surface properties and appearance by separating and exfoliating each unit layer of layered phyllosilicate to divide one coagulated particle of the layered phyllosilicate into numerous, extremely fine laminar particles and by dispersing the same in a thermoplastic polyester resin independently and uniformly. Another object of the present invention is to provide a reinforced thermoplastic resin composition having improved dimensional accuracy and a thermoplastic resin composition having improved mechanical properties and heat resistance without deterioration of resins, foaming, lowering of surface properties and decrease in dimensional stability.

DISCLOSURE OF INVENTION

The present invention is achieved by the inventors through intense study in view of these actual conditions.

That is, the first of the present invention is a polyester resin composition containing a thermoplastic polyester resin and layered phyllosilicate, wherein said layered phyllosilicate in said resin composition satisfies at least one of the following conditions (a) to (c):

(a) ratio of layered phyllosilicate having equivalent area circle diameter [D] of at most 3,000 Å is at least 20%;
(b) a mean value of equivalent area circle diameter [D] is at most 5000 Å;
(c) the number of particles [N] per unit ratio of layered phyllosilicate present in 100 μm$^2$ of a resin composition is at least 30.

The second of the present invention is the polyester resin composition of Claim 1, wherein the layered phyllosilicate in the resin composition satisfies at least one of the following conditions (d) to (f):

(d) average aspect ratio (ratio of layer length/layer thickness) is 10 to 300;
(e) the maximum layer thickness is at most 2,000 Å;
(f) average layer thickness is at most 500 Å.

A preferable embodiment of the present invention is a polyester resin composition which satisfies all of said (d) to (f).

The third of the present invention is a polyester resin composition containing a thermoplastic polyester resin and layered phyllosilicate, wherein at least one of the following conditions (g) to (i) is satisfied:

(g) difference $(\eta_e - 3\eta)$ between extensional viscosity $\eta_e$ and a value three times the shear viscosity $\eta$ at 280° C. under shear rate of 100 (1/s) is larger than 300 Pa·s;
(h) difference $\Delta\eta_e$ between $\eta_e$ under shear rate of 100 (1/s) and $\eta_e$ under shear rate of 1,000 (1/s) at 280° C. is at least 500 Pa·s;
(i) product $J_{e0}\eta_0$ of equilibrium compliance $J_{e0}$ by zero shear viscosity $\eta_0$ at 280° C. is at least 0.8 second.

A preferable embodiment of the present invention is a polyester resin composition which satisfies all of said (g) to (i).

A further preferable embodiment of the present invention is any of the above polyester resin composition which contains a fibrous filler and/or a polycarbonate resin.

The fourth of the present invention is a process for producing a polyester resin composition containing a thermoplastic polyester resin and layered phyllosilicate comprising:

(A) a step for preparing a dispersion of layered phyllosilicate and water containing layered phyllosilicate and water;
(B) a step for mixing a polymerizable pre-polymer of the thermoplastic polyester resin with said dispersion of layered phyllosilicate and water; and
(C) a step for polymerizing the thermoplastic polyester resin.

BEST MODE FOR CARRYING OUT THE INVENTION

Figure 1:
FIG. 1 is a micrograph by a transmission electron microscope of the polyester resin composition containing layered phyllosilicate prepared in Example 1. Numeral 1 shows the layered phyllosilicate dispersing in the thermoplastic resin.

The thermoplastic polyester resin used in the present invention is any of conventionally known thermoplastic resins, which are obtained by reaction of an acid component having a dicarboxylic acid compound and/or an ester-forming derivative of dicarboxylic acid as a main component with a diol component having a diol compound and/or an ester-forming derivative of diol compound as a main component.

The above main component means a component whose ratio to the acid or diol component accounts for at least 80%, possibly at least 90%, respectively, and the upper limit thereof is 100%.

Concrete examples of the thermoplastic resin are poly(ethylene terephthalate), poly(propylene terephthalate), poly(butylene terephthalate), poly(hexamethylene terephthalate), poly(cyclohexane-1,4-dimethyl terephthalate), neopentyl terephthalate, poly(ethylene iso-phtharate), poly(ethylene naphthalate), poly(butylene naphthalate), poly(hexamethylene naphthalate) and the like. Further examples include copolyester obtained by using at least two of acid and/or diol components used for preparing these resins.

The above thermoplastic polyester resin can be used alone or in combination of two or more resins whose composition or component is different and/or resins whose inherent viscosity is different.

Among the above polyester resins, poly(ethylene terephthalate), poly(butylene terephthalate), poly(cyclohexane-1,4-dimethyl terephthalate) and poly(ethylene naphthalate) are preferable from the viewpoints of strength, elastic modulus, heat resistance, handling properties, availability, cost, and the like.

As to the molecular weight of the thermoplastic polyester resin, logarithmic viscosity measured at 25° C. by using phenol/tetrachloroethane (5/5 in weight ratio) mixed solvent is 0.3 to 2.0 (dl/g), preferably 0.3 to 1.8 (dl/g), more preferably 0.3 to 1.5 (dl/g), most preferably 0.3 to 1.2 (dl/g). When the logarithmic viscosity is less than 0.3 (dl/g), the polyester resin composition to be obtained tends to have low mechanical properties or impact resistance. When it is more than 2.0 (dl/g), molding flowability tends to be lowered due to high melting viscosity.

The fibrous filler used in the present invention is not particularly limited, and a generally used fibrous material is usually employed. Examples of the fibrous filler are glass fiber, carbon fiber, aramid fiber, silicon carbide fiber, alumina fiber and boron fiber, whiskers such as silicon carbide whisker, silicon nitride whicker, magnesium oxide whisker, potassium titanate whisker and alunimo borate whisker, and needle crystals such as wollastonite, zonotolite, PMF, plaster fiber, dawsonite, MOS, phosphate fiber and sepiolite.

In view of improvement effect on mechanical properties and heat resistance, availability and the like, preferable examples of the fibrous filler are glass fiber, carbon fiber, potassium titanate whisker, silicon nitride whisker, aramid fiber and alumina fiber, while glass fiber and carbon fiber are more preferable.

Though the shape of the fibrous filler used in the present invention is not particularly limited, preparation tends to be difficult when the fiber diameter is too small, while mechanical properties of the molded article tends to be lowered when it is too large. Also, reinforcing effect tends to be small when the aspect ratio is too small, while there is a tendency that appearance of the molded article is deteriorated and dimensional accuracy is lowered when it is too large. Accordingly, as to the shape of the reinforcing filler, the diameter is 2 to 20 μm, preferably 3 to 18 μm, more preferably 4 to 15 μm, in case of, for example, a glass fiber and a carbon fiber. When the diameter of the fiber is smaller than 2 μm, preparation tends to be difficult. When it is larger than 20 μm, surface properties and mechanical properties of the molded article tend to be lowered. Meanwhile, the aspect ratio (ratio of fiber length/fiber diameter) in the molded article is 2 to 70, preferably 3 to 60, more preferably 5 to 50. When the aspect ratio is smaller than 2, improving effect on elastic modulus and heat deformation temperature tends to be small. When it is larger than 70, there is a tendency that appearance of the molded article is deteriorated and dimensional accuracy is lowered. The aspect ratio of the fibrous filler refers to a value obtained by dividing fiber length by fiber diameter of the fibrous filler in the reinforced polyester resin composition of the present invention. In the present specification, the fiber length means an average length of each fiber dispersed in the reinforced polyester resin composition of the present invention. The fiber length and fiber diameter can be quantified according to a method of randomly selecting an area containing at least 100 fibers on a photographic image taken by using a microscope or the like, followed by imamging and calculation of the image by using an image analysis device or the like, or a method of direct measurement on the photograph.

In case of adding a fibrous filler in the polyester resin composition of the present invention, the upper limit of the amount of the fibrous filler is 30% by weight, preferably 25% by weight, more preferably 20% by weight and most preferably 15% by weight based on 100 parts by weight of the thermoplastic polyester resin. When the upper limit is larger than 30% by weight, lowering of dimensional accuracy and deterioration of surface appearance tend to be caused. The lower limit of the amount of the fibrous filler is 0.5% by weight, preferably 1.0% by weight, and more preferably 1.5% by weight. When the amount is less than 0.5% by weight, there may be cases where improvement effect on mechanical properties and heat resistance cannot be easily achieved.

The polycarbonate resin used in the present invention is not particularly limited, and includes any of aliphatic, alicyclic or aromatic polycarbonate. Among them, aromatic polycarbonate is preferable. It is prepared by reaction of at least one bisphenol which may contain multivalent phenol with carbonates such as bisalkyl carbonate, bisaryl carbonate and phosgene. Examples of the bisphenols are bis(4-hydroxyphenyl)methane, 1,1-bis(4-hydroxyphenyl)ethane, 1,1-bis(4-hydroxyphenyl)propane, 2,2-bis(4-hydroxyphenyl)propane, i.e., bisphenol-A, 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)cyclopentane, 1,1-bis(4-hydroxyphenyl)cyclohexane, bis(4-hydroxy-3-methylphenyl)methane, bis(4-hydroxy-3-methylphenyl)phenylmethane, 1,1-bis(4-hydroxy-3-methylphenyl)ethane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-sec-butylphenyl)propane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydoroxyphenyl)diphenylmethane, bis(4-hydoroxyphenyl)dibenzylmethane, 4,4'-dihydroxy diphenyl ether, 4,4'-dihydroxydiphenylsulfone, 4,4'-dihydroxydiphenylsulfide, 4,4'-dihydroxybenzophenone, phenolphthalein and the like. Among them, bisphenol A is the most typical example.

Examples of the carbonate are bisalkyl carbonate such as dimethyl carbonate, diethyl carbonate, di-n-propyl carbonate, diisopropyl carbonate, di-n-butyl carbonate, and aryl carbonate such as diphenyl carbonate, bis(2,4-dichlorophenyl) carbonate, bis(2,4,6-trichlorophenyl) carbonate, bis(2-nitrophenyl) carbonate, bis(2-cyanophenyl) carbonate, bis(4-methylphenyl) carbonate, bis(3-methylphenyl) carbonate and dinaphtyl carbonate. Among them, dimethyl carbonate, diethyl carbonate and diphenyl carbonate are most preferably used from the viewpoint of availability and easy reaction.

Examples of the polycarbonate used in the present invention are 2,2-bis(4-hydroxyphenyl)propane polycarbonate, 2,2-bis(3,5-dimethyl-4-hydroxyphenyl)propane polycarbonate, 1,1-bis(4-hydroxyphenyl)cyclohexane polycarbonate, 4,4'-dihydroxy phenyl ether polycarbonate, 4,4'-dihydroxydiphenylsulfide polycarbonate, 4,4'-dihydroxydiphenylsulfone polycarbonate, bis(4-hydroxyphenyl)ketone polycarbonate, 1,4-bis(4-hydroxyphenylsulfonyl)benzen and the like.

The molecular weight of the polycarbonate resin used in the present invention is not particularly limited, but the weight average molecular weight Mw, measured according to gel permeation chromatography by using a tetrahydrofuran (THF) solvent at 40° C., is, for example, 15,000 to 80,000, more preferably 30,000 to 70,000 converted to mono-molecular weight distribution of polystyrene. When Mw is less than 15,000, mechanical properties of the molded article of the composition to be prepared tends to be lowered. When it is more than 80,000, it tends to cause problems with processability such as flowability during molding.

The layered phyllosilicate of the present invention mainly comprises a tetrahedral crystalline sheet of silicon oxide, and an octahedral crystalline sheet of metal hydroxide. Examples of the layered phyllosilicate are smectite clay, swellable mica and the like. The layered phyllosilicate is not treated with any finishing agent such as a silane compound or an organic onium salt or any swelling agent. In other words, since it is not necessary to treat swellable silicate with any finishing agent such as a silane compound or an organic onium salt, or any swelling agent, no harmful effect such as deterioration and coloring of a resin and lowering of thermal stability due to the finishing agent or the swelling agent can be found in the present invention.

The above smectite clay, naturally existing or being synthesized, is represented by the following general formula (1):

$$X_{0.2-0.6}Y_{2-3}Z_4O_{10}(OH)_2 \cdot nH_2O \quad (1)$$

wherein X is at least one selected from the group consisting of K, Na, ½ Ca and ½ Mg, Y is at least one selected from the group consisting of Mg, Fe, Mn, Ni, Zn, Li, Al and Cr, and Z is at least one selected from the group consisting of Si and Al; and H$_2$O indicates a molecule of water bonding to an interlayer ion while n fluctuates significantly depending on the interlayer ion and relative humidity. Examples of the smectite clay are montmorillonite, videlite, nontronite, saponite, iron saponite, hectorite, sauconite, stevensite, bentonite and the like, or substitutes, derivatives, and mixture thereof. The basal space of the above smectite clay in the state of the initial coagulation is about 10 to 17 Å, and the average particle size of the smectite clay in the state of coagulation is about 1,000 to 1,000,000 Å.

The above swellable mica, naturally existing or being synthesized, is represented by the following general formula (2):

$$X_{0.5-1.0}Y_{2-3}(Z_4O_{10})(F,OH)_2 \quad (2)$$

wherein X is at least one selected from the group consisting of Li, Na, K, Rb, Ca, Ba and Sr, Y is at least one selected from the group consisting of Mg, Fe, Ni, Mn, Al and Li, and Z is at least one selected from the group consisting of Si, Ge, Al, Fe and B. They have swelling property into water, a polar solvent compatible to water in arbitrary ratio and into a mixed solvent of water and the polar solvent. Examples thereof are lithium teniolite, sodium teniolite, lithium tetrasilicic mica, sodium tetrasilicic mica and the like, or substitutes, derivatives and mixture thereof. The basal space of the above swellable mica in the state of the initial coagulation is about 10 to 17 Å, and the average particle size of the swellable mica in the state of coagulation is about 1,000 to 1,000,000 Å.

Some of the above swellable mica has a similar construction to vermiculites, and those vermiculites equivalents are also useful. Examples of the vermiculites equivalents include a tri-octahedron type and a di-octahedron type, represented by the following general formula (3):

$$(Mg,Fe,Al)_{2-3}(Si_{4-x}Al_x)O_{10}(OH)_2 \cdot (M^+,M^{2+}_{1/2}) \cdot nH_2O \quad (3)$$

wherein M is a convertible cation of alkali or alkaline earth metal such as Na or Mg, x indicates 0.6 to 0.9 and n indicates 3.5 to 5. The basal space of the above vermiculites equivalents in the state of the initial coagulation is about 10 to 17 Å, and the average particle size in the state of coagulation is about 1,000 to 5,000,000 Å.

A preferable crystalline structure for the layered phyllosilicate is those with high purity having a regular lamination in the direction of the c-axis. However, there can be also used so-called mixed-layered minerals whose crystalline cycle is disordered and which have a plurality of crystalline structure.

It may be possible to use layered phyllosilicate alone or in combination of two or more. Among them, montmorillonite, bentonite, hectolite, and swellable mica containing a sodium ion between layers are preferable from the viewpoints of availability, dispersibility into the polyester resin composition to be obtained, and improvement effect on properties of the polyester resin composition.

The lower limit of the amount of the layered phyllosilicate in the polyester resin composition of the present invention is typically 0.1 part by weight, preferably 0.3 part by weight, further preferably 0.5 part by weight, more preferably 1.0 part by weight, and most preferably 1.5 parts by weight based on 100 parts by weight of the thermoplastic polyester resin. The upper limit is typically adjusted to 45 parts by weight, preferably 40 parts by weight, further preferably 35 parts by weight, more preferably 30 parts by weight, and most preferably 25 parts by weight. When the lower limit of the layered phyllosilicate is less than 0.1 part by weight, improvement effect on mechanical properties, heat deformation temperature, dimensional stability and mold releasing ability may be insufficient. When the upper limit is more than 45 parts by weight, appearance of the molded article and flowability during molding tend to be deteriorated.

In case of adding a fibrous filler, the upper limit of the amount of the layered phyllosilicate is adjusted to 30 parts by weight, preferably 28 parts by weight, further preferably 25 parts by weight, more preferably 23 parts by weight and most preferably 20 parts by weight. When the upper limit is more than 30 parts by weight, appearance of the molded article and flowability during molding tend to be deteriorated.

In case of adding a polycarbonate resin, the lower limit and the upper limit of the amount of the layered phyllosilicate based on 100 parts by weight of the resin component comprising a thermoplastic polyester resin and the polycarbonate resin is the same as the case where no fibrous filler is added.

The lower limit of the ash content ratio of the thermoplastic resin derived from the layered phyllosilicate is typically adjusted to 0.1% by weight, preferably 0.3% by weight, further preferably 0.5% by weight, more preferably 1.0% by weight, and most preferably 1.5% by weight. The upper limit of the ash content ratio is typically adjusted to 30% by weight, preferably 28% by weight, further preferably 25% by weight, more preferably 23% by weight, and most preferably 20% by weight. When the lower limit of the ash content ratio is less than 0.1% by weight, improvement effect on mechanical properties, heat deformation temperature, dimensional stability and mold releasing ability may be insufficient. When the upper limit is more than 30% by weight, appearance of the molded article and flowability during molding tend to be deteriorated.

In case of adding a fibrous filler, the upper limit of the amount of the ash content ratio is adjusted to 23% by weight, preferably 20% by weight, more preferably 18% by weight, and most preferably 15% by weight. When the upper limit of the ash content ratio is more than 23% by weight, appearance of the molded article and flowability during molding tend to be deteriorated.

Herein, the ash content ratio refers to the weight ratio of a residual layered phyllosilicate component to a resin when a thermoplastic resin composition is heated and incinerated at about 620° C., and is measured, for example, according to JIS K 7052.

The structure and shape of the layered phyllosilicate dispersed in the thermoplastic resin composition of the present invention is completely different from those which the layered phyllosilicate had before mixing, i.e., a coagulated structure comprising lamination of multiple layers. In other words, layers of the layered phyllosilicate are cleft and separated to be independent from each other. As a result, the layered phyllosilicate disperses into the thermoplastic polyester resin composition in the state of extremely fine and independent flakes, and the number is remarkably increased compared with that of the layered phyllosilicate before mixing. The state of dispersion can be described according to equivalent area circle diameter [D], number of dispersed particle [N], aspect ratio (layer length/layer thickness), average layer thickness and the maximum layer thickness mentioned below.

First, the equivalent area circle diameter is defined as a diameter of a circle whose area is equal to the areas of layered phyllosilicate dispersed in various forms seen in an image obtained by using a microscope or the like. In that case, the ratio of the number of the layered phyllosilicate having equivalent area circle diameter [D] of at most 3,000 Å is at least 20% by weight, preferably at least 35% by weight, more preferably at least 50% by weight, and most preferably at least 65% by weight among the layered phyllosilicate dispersed in the polyester resin composition. When the ratio of the layered phyllosilicate having equivalent area circle diameter [D] of at most 3,000 Å is less than 20% by weight, improvement effect on mechanical properties, heat deformation temperature, heat resistance, dimensional stability, dimensional accuracy and moldability tends to be insufficient. Also, the average value of equivalent area circle diameter [D] of the layered phyllosilicate in the polyester resin composition of the present invention is at most 5,000 Å, preferably at most 4,500 Å, more preferably at most 4,000 Å, and most preferably at most 3,500 Å. When the average value of equivalent area circle diameter [D] is larger than 5,000 Å, there is a tendency that improvement effect on mechanical properties, dimensional accuracy, heat deformation temperature and heat resistance are insufficient and surface properties are deteriorated. The lower limit is not particularly specified, but it may not be necessary to be less than 100 Å because there is almost no difference in advantage when it is less than 100 Å.

For measuring equivalent area circle diameter [D], it can be quantified by randomly selecting an area containing at least 100 layers of the layered phyllosilicate on a photograph taken by using a microscope or the like, followed by imaging and calculation of the image by using an image analysis device or the like.

When the number of dispersed particle [N] is defined as the number of dispersed particles of the layered phyllosilicate per unit weight in 100 $\mu m^2$ of the thermoplastic resin composition, the value [N] of the layered phyllosilicate in the thermoplastic resin composition is at least 30, preferably at least 40, more preferably at least 50 and most preferably at least 60. The upper limit is not particularly specified, but it may not be neccessary to be more than 1,000 because there is no further advantage when it is more than 1,000. For example, the value [N] can be obtained as follows. That is, the value can be measured by cutting the thermoplastic resin composition into a micro thin piece of about 50 $\mu m$ to 100 $\mu m$ in thickness and dividing the number of particles of layered phyllosilicate present in any 100 $\mu m^2$ area on the image of the piece photographed by TEM or the like by the weight ratio of the used layered phyllosilicate. Alternatively, the value [N] can be obtained by selecting any region (area of which should always be measured beforehand) containing at least 100 particles on an TEM image, dividing the number of particles present in the image by weight ratio of the used layered phyllosilicate and converting the same to the value for an area of 100 $\mu m^2$. Therefore, the value [N] can be quantified by using TEM photographs or the like of thermoplastic resin compositions.

When the average aspect ratio is defined as an average value among the ratios of the layer length to the layer thickness of the layered phyllosilicate dispersed in the resin, the average aspect ratio of the layered phyllosilicate in the thermoplastic resin composition is 10 to 300, preferably 15 to 300, more preferably 20 to 300. The average aspect ratio of less than 10 tends to cause insufficient improvement effect on mechanical properties, elastic modulus, heat deformation temperature, heat resistance and dimensional stability of the thermoplastic resin composition to be obtained. The aspect ratio need not be larger than 300 since there is no further change in advantage.

When the average layer thickness is defined as the average value of the layer thickness of the layered phyllosilicate dispersed in the thin plate-like shape, the upper limit of the average layer thickness is at most 500 Å, preferably at most 450 Å, more preferably at most 400 Å. When the average layer thickness is more than 500 Å, there may be a case where improvement effect on mechanical properties, heat deformation temperature, heat resistance and dimensional stability of the thermoplastic resin composition to be obtained are insufficient. When the upper limit of the average layer thickness is more than 500 Å, surface properties may be deteriorated and improvement effect on dimensional accuracy may not be achieved sufficiently. The lower limit of the average layer thickness is more than 10 Å though it is not particularly limited thereto.

When the maximum layer thickness is defined as the maximum of the layer thickness of the layered phyllosilicate dispersed into the thermoplastic resin composition in the plate-like shape, the upper limit of the maximum layer thickness of the layered phyllosilicate is at most 2,000 Å, preferably at most 1,800 Å, more preferably at most 1,500 Å. When the maximum layer thickness is more than 2,000 Å, surface properties may be deteriorated and improvement effect on dimensional accuracy may not be achieved sufficiently. The lower limit of the maximum layer thickness is more than 10 Å though it is not particularly limited thereto.

The thickness and length of the layer can be measured from images of a film, a thin molded article and the like photographed by a microscope or the like, the film being prepared by thermal press molding or elongation molding and the molded article being prepared by injection molding after thermally melting a thermoplastic resin composition.

That is, the film or a plate-like injection molded test specimen having thickness of about 0.5 to 2 mm prepared according to the above process is placed on the X-Y plane. On a parallel with the X-Z plane or the Y-Z plane, the film or the test specimen is cut into an extremely thin piece of about 50 µm to 100 µm in thickness. The piece is observed by using a transmission electron microscope or the like at a magnification of as high as ×40,000 to 100,000. Then the measurement can be performed according to quantification by randomly selecting an area containing at least 100 layers of the layered phyllosilicate on the image of the transmission electron microscope obtained by the above method, followed by imaging and calculation of the image by using an image analysis device or the like. Alternatively, a ruler or the like can be used for the measurement.

As mentioned above, the shape of the layered phyllosilicate in the polyester resin composition of the present invention is fine and thin platelet. When part of the flaky layered phyllosilicate is unevenly dispersed in the resin composition, mechanical properties, heat deformation temperature, dimensional stability and moldability may not be improved efficiently. Therefore, it is preferable that the fine and flaky layered phyllosilicate is uniformly dispersed in the polyester resin composition of the present invention from the viewpoint of the expression of its properties. The above-mentioned uniformity of the fine and flaky layered phyllosilicate can be described according to rheological behaviors of a resin composition such as product $J_{e0} \cdot \eta_0$ of equilibrium compliance $J_{e0}$ by zero shear viscosity $\eta_0$, difference $\eta_e - 3\eta$ between extensional viscosity $\eta_e$ and a value three times the shear viscosity $\eta$, and difference $\Delta\eta_e$ between each extensional viscosity measured at different shear rates.

The above equilibrium compliance $J_{e0}$ is an elastic deformation measure while the above zero shear viscosity $\eta_0$ is a measure for resistance to plastic deformation. Therefore, product $J_{e0} \cdot \eta_0$ of equilibrium compliance by zero shear viscosity serves as an index for the maximum relaxation time of a resin, indicating whether polymer chain entanglement is easily loosened or not. The equilibrium compliance $J_{e0}$ and the zero shear viscosity $\eta_0$ can be measured based on the following method. First, a sample is melted and interposed between a cone and a plate, and a pre-determined stress is induced thereto to measure strain which appears on the sample according to a melt viscoelasticity analyzer of stress controlling type at 280° C. The creep compliance J (t) at this point is defined by the following equation (4):

$$J(t) = \gamma(t)/\sigma \qquad (4)$$

wherein $\gamma(t)$ indicates strain, $\sigma$ indicates stress and t indicates time. J(t) is calculated from the obtained strain value to draw a creep curve. In addition, creep compliance after sufficient elapse is described approximately by the following equation (5):

$$J(t) = J_{e0} + t/\eta_0 \qquad (5)$$

wherein $J_{e0}$ indicates equilibrium compliance and $\eta_0$ indicates zero shear viscosity. The creep curve is approximated by a line, whose intercept yields the value of equilibrium compliance $J_{e0}$ and whose slope yields the value of $\eta_0$. In the equation (5), the first term ($J_{e0}$) shows elastic deformation, while the second term ($t/\eta_0$) shows plastic deformation.

Therefore, $J_{e0} \cdot \eta_0$ at 280° C. of the polyester resin composition of the present invention is at least 0.8 second, preferably at least 0.9 second, further preferably at least 1.0 second, more preferably at least 1.2 seconds and most preferably at least 1.5 seconds. It can be said that the fine and flaky layered phyllosilicate is uniformly dispersed into the polyester resin when $J_{e0} \cdot \eta_0$ of the polyester resin composition is at least 0.8 second. This brings about a remarkable improvement in mechanical properties, heat resistance, dimensional accuracy and mold releasing ability of the polyester resin composition of the present invention. Along with the fact that melt-molding can be easily performed, a foamed article having higher closed cell content and higher expansion ratio can be achieved also in foam-molding because cells can be prevented from breaking. The upper limit of $J_{e0} \cdot \eta_0$ of the polyester resin composition is 20 seconds, preferably 15 seconds, more preferably 12 seconds from the viewpoint of melt-molding.

Meanwhile, difference $\eta_e - 3\eta$ between extensional viscosity $\eta_e$ and a value three times the shear viscosity $3\eta$ can be an index for strain curability. The strain curability refers to a property such that extensional viscosity grows as strain is increased. The strain rate is described on Journal of Japan Rheology Society vol. 13, pages 13 to 23.

In the method of measuring extensional viscosity by stretching sample molded into a bar or strip in the state of melting, the extensional viscosity value increases, then approaches $3\eta$, and reaches a stationary value in the absence of strain curability as the sample is stretched (strain is increased). On the other hand, in the presence of strain curability, the extensional viscosity value first rises up significantly from $3\eta$ and then reaches a stationary value as strain is increased. That is, $\eta_e - 3\eta$ is at most 0 in the absence of strain curability, while $\eta_e - 3\eta$ is more than 0 in the presence of strain curability, meaning the larger the strain curability, the larger the value. For these reasons, $\eta_e - 3\eta$ values can be regarded as an index for strain curability.

Since melting viscosity of a polyester resin is low, sample in the form of bar or strip cannot maintain its shape in a melting state and extensional viscosity cannot be measured according to the above methods. Therefore, measurement of extensional viscosity of the polyester resin composition of the present invention was performed in accordance with the method described in Japanese Unexamined Patent Publication No. 113038/1997. Specifically, pressure losses of each melted resin are measured by using a capillary rheometer equipped with a long die and a short die whose diameters are the same. Next, pressure loss $p_0$ for a die whose length is hypothetically 0 is calculated according to the equation (6):

$$p_0 = (p_2 \cdot L_1 - p_1 \cdot L_2)/(L_1 - L_2) \qquad (6)$$

wherein $p_1$ indicates pressure loss measured by the long die, $p_2$ indicates pressure loss measured by the short die, $L_1$ indicates the length of the long die, and $L_2$ indicates the length of the short die.

The shear viscosity $\eta$ and the shear rate $\dot{\gamma}$ can be determined by using a capillary rheometer.

The extensional viscosity $\eta_e$ and the strain rate $\dot{\epsilon}$ are measured according to the following equations (7) and (8), respectively:

$$\eta_e = [9(n+1)^2 p_0^2]/32\eta\dot{\gamma}^2 \tag{7}$$

$$\dot{\epsilon} = 4\eta\dot{\gamma}^2/3(n+1)p_0 \tag{8}$$

wherein $\dot{\gamma}$ is shear rate and $\eta$ is shear viscosity.

The letter n indicates power low index defined by the following formula (9):

$$\eta = c\dot{\gamma}^{n-1} \tag{9}$$

wherein c indicates a constant number.

The value $\eta_e$ measured according to this kind of method is extensional viscosity.

Thus, strain curability ratio can be calculated from $\eta_e$ and $\eta$ measured according to the above method as shown below. The strain curability ratio, therefore, refers to the value calculated by means of the following method.

After measuring extensional viscosity and shear viscosity of the resin at 280° C. according to the above method, the relationship between shear rate and shear viscosity is approximated by the least squares method based on the following equation (10):

$$\eta = a\dot{\gamma}^p \tag{10}$$

to calculate a and p. The relationship between shear rate and extensional viscosity is approximated by the least squares method based on the following equation (11):

$$\eta_e = b\dot{\epsilon}^q \tag{11}$$

to calculate b and q.

Difference $\eta_e - 3\eta$ between $\eta_e$ at $\dot{\epsilon} = 100$ (1/s) and $3\eta$ at $\dot{\gamma} = 100$ (1/s) is referred to as the index for strain curability in the present invention, which can be calculated by $b \cdot 100^q - 3 a \cdot 100^p$.

Accordingly, the strain curability index $\eta_e - 3\eta$ at 280° C. under shear rate of 100 (1/s) is at least 300 Pa·s, preferably at least 350 Pa·s, further preferably at least 400 Pa·s, more preferably at least 500 Pa·s, and most preferably at least 600 Pa·s in the polyester resin composition of the present invention. When the strain curability index $\eta_e - 3\eta$ is at least 300 Pa·s, it can be said that the fine and flaky layered phyllosilicate is uniformly dispersed in the polyester resin. This brings about a remarkable improvement in mechanical properties, heat resistance, dimensional accuracy and mold releasing ability of the polyester resin composition of the present invention. Additionally, melt-molding can be easily performed. Though there is no particular limitation, the upper limit thereof is about 15,000 Pa·s.

Also, extensional viscosity can be measured in the same manner as the above. Accordingly, in the polyester resin composition of the present invention, difference $\Delta\eta_e$ between $\eta_e$ under shear rate of 100 (1/s) and $\eta_e$ under shear rate of 1,000 (1/s) at 280° C. is at least 500 Pa·s, preferably 600 Pa·s, more preferably 700 Pa·s. When $\Delta\eta_e$ of the polyester resin composition of the present invention is at least 500 Pa·s, it can be said that the fine and flaky layered phyllosilicate is uniformly dispersed in the polyester resin. This brings about a remarkable improvement in mechanical properties, heat resistance, dimensional accuracy and mold releasing ability. Additionally, melt-molding can be easily performed. Though there is no particular limitation, the upper limit thereof is about 15,000 Pa·s.

The process for preparing a polyester resin composition of the present invention is not particularly limited, but a preferable process include a process comprising (A) a step for preparing a dispersion of layered phyllosilicate and water containing layered phyllosilicate and water; (B) a step for mixing a polymerizable pre-polymer of the thermoplastic polyester resin with the above dispersion of layered phyllosilicate and water; and (C) a step for polymerizing the polymerizable prepolymer.

As to the step (A) of the process for preparing a polyester resin composition of the present invention, the method of preparing a dispersion of layered phyllosilicate and water is not particularly limited, but a conventionally known wet stirrer and the like can be used therefor. Examples of the wet stirrer includes a high-speed stirrer performing stirring with a stirrer wing rotating at a high speed, wet mills in which sample is wet-milled in the space between a rotor and a stator, where high shear rate is induced, mechanical wet mills in which a hard medium is used, wet collision mills in which sample collides with the walls by using jet nozzle 1, and the like. For efficient mixing, stirring speed of at least 500 rpm or shear rate of at least 300 (1/s) is induced. The upper limit of the stirring speed is 25,000 rpm, and the upper limit of the shear rate is 500,000 (1/s). It is not necessary to perform the stirring over the upper limit, since there is no further change in advantage.

The dispersion of layered phyllosilicate and water contains a polar solvent compatible to water in an arbitrary ratio, if necessary. Examples of the polar solvent are alcohols such as methanol, ethanol and isopropanol, glycols such as ethylene glycol, propylene glycol, 1,4-butanediol, ketones such as acetone and methyl ethyl ketone, ethers such as diethyl ether and tetrahydorofuran, amide compounds such as dimethylformamide, and other solvents such as dimethylsulfoxide and 2-pyrrolidone. These polar solvents may be used alone or in combination of two or more.

By preparing the dispersion of layered phyllosilicate and water according to the above method, the initial lamination and coagulation structure of the layered phyllosilicate disappears and intervals between each layer is broadened to create so-called swelling state. Basal spaces can be used as an index for the swelling state. The dispersion of layered phyllosilicate and water has a basal space of at least three times, preferably four times, more preferably five times the initial basal space. When the basal space is less than three times, there is a tendency that the layered phyllosilicate does not cleave or disperse finely in an efficient manner.

The upper limit of the ratio of the layered phyllosilicate contained in the dispersion of layered phyllosilicate and water is not particularly limited, but it is 50% by weight, preferably 40% by weight, further preferably 30% by weight, more preferably 25% by weight, and most preferably 20% by weight from the viewpoint of the dispersibility of the layered phyllosilicate. The lower limit of the ratio of the layered phyllosilicate is not particularly limited, but it is 0.5% by weight, preferably 1.0% by weight, further preferably 1.5% by weight, more preferably 2.0% by weight, and most preferably 3.0% by weight from the viewpoint of working efficiency.

Herein, in the present specification, initial basal space of layered phyllosilicate refers to the basal space of layered phyllosilicate in particles whose unit layers are laminated and coagulated to each other before it is added to a dispersion medium. The basal space can be measured according to small angle X-ray diffraction method (SAXS) or the like.

Specifically, the basal space can be obtained by measuring peak angle value through X-ray diffraction derived from layered phyllosilicate in the dispersion of layered phyllosilicate and water according to SAXS, and applying the peak angle value to the Bragg equation.

As to rhe step (B) of the process for preparing a polyester resin composition of the present invention, it is possible to apply the method of mixing a polymerizable pre-polymer of a thermoplastic polyester resin with the above dispersion of layered phyllosilicate and water.

Herein, the polymerizable pre-polymer of a thermoplastic polyester resin means at least one selected from a polymerizable monomer or a component having low polymerization degree in the thermoplastic polyester resin.

The polymerizable monomer of a thermoplastic polyester resin means an acid component having a dicarboxylic acid compound and/or an ester-forming derivative of dicarboxylic acid as a main component and a diol component having a diol compound and/or an ester-forming derivative of diol compound as a main component.

Examples of the above aromatic dicarboxylic acid are terephthalic acid, isophthalic acid, orthophthalic acid, 2,6-naphthalene dicarboxylic acid, 4,4'-biphenyl dicarboxylic acid, 4,4'-diphenylether dicarboxylic acid, 4,4'-diphenylmethane dicarboxylic acid, 4,4'-diphenylsulfone dicarboxylic acid, 4,4'-diphenylisopropylidene dicarboxylic acid and the like. Other useful examples include substitutes thereof (such as alkyl group substitute of methyl isophthalate), derivatives thereof (such as alkyl ester compounds including dimethyl terephthalate and dimethyl 2,6-naphthalene dicarbonate), and the like. Additionally, hydroxy acid and esterification derivatives thereof such as p-oxybenzoic acid and p-hydroxyethoxy benzoic acid can also be used. It may be possible to use at least two of these monomers in combination use. At least one of aliphatic dicarboxylic acids such as adipic acid, azelaic acid, dodecanedioic acid acid and sebacic acid can be used in combination use with these aromatic dicarboxylic acids, provided the use is in such a small amount that characteristics of the polyester resin composition to be obtained is not lost.

Among the above acid components, it is preferable to use terephthalic acid, 2,6-naphthalene dicarboxylic acid, 4,4'-biphenyl dicarboxylic acid and esterification derivatives thereof from the viewpoint of crystallinity, strength, heat resistance, handling properties, availability and elastic modulus of the thermoplastic polyester resin to be obtained.

Examples of the above diol compound are an aliphatic glycol such as ethylene glycol, propylene glycol, butylene glycol, hexylene glycol or neopentyl glycol; an alicyclic glycol such as 1,4-cyclohexane dimethonol; and an aromatic diol such as 1,4-phenylene dioxydimethanol. A Cyclic ester such as $\epsilon$-caprolactone can be also used. It may be possible to use at least two of these in combination use. In addition, a long-chain diol compound (such as polyethylene glycol and polytetramethylene glycol) or alkylene oxide adduct polymer of bisphenols (such as ethylene oxide adduct polymer of bisphenol-A) can be used in combination therewith, as long as the use is in such a small amount that characteristics of the polyester resin composition to be obtained is not lost.

Among the above diol components, ethylene glycol, butylene glycol and 1,4-cyclohexane dimethanol are preferable from the viewpoint of handling properties, strength, heat resitance, handling property, availability, elastic modulus and the like of the polyester resin composition to be obtained.

The component having low polymerization degree of the thermoplastic polyester resin refers to a condensate which is obtained by reaction of the above polymerizable monomer and which has a molecular weight such that melt viscosity enables uniform and satisfactory dispersion of a dispersion of layered phyllosilicate and water containing layered phyllosilicate in the state of melting. The logarithmic viscosity of the component having low polymerization degree is less than 0.4 (dl/g), preferably at most 0.35 (dl/g), and more preferably at most 0.30 (dl/g) from the viewpoint of uniform dispersion of the dispersion of layered phyllosilicate and water.

It is permissible to add another or at least two compounds selected from the group consisting of aromatic dicarboxylic acids or esterification derivatives thereof, and diol compounds or esterification derivatives thereof to the polyester component having low polymerization degree in the state of melting, as long as logarithmic viscosity is in the above range.

The method of preparing the above component having low polymerization degree is not particularly limited. Examples of the method of preparing the above component having low polymerization degree are general methods such as a method of esterifying an aromatic dicarboxylic acid with a diol compound and a method of transesterifying an alkyl aromatic dicarbonate with a diol compound. In addition to these methods of preparing the component having low polymerization degree by condensation reaction of an aromatic dicarboxylic acid or an esterification derivative thereof with a diol compound or an esterification derivative thereof, there are methods of preparing the above polymer by depolymerizing a part or all of the thermoplastic polyester resin with a diol compound. Specifically, these include a method of heating a mixture of a thermoplastic polyester resin and a diol compound as raw materials and depolymerizing the same within a temperature range of about 150° C. to the melting point of the thermoplastic polyester resin, or a method of previously melting a thermoplastic polyester resin as a raw material at temperature higher than the melting point of the thermoplastic polyester resin and depolymerizing the same by adding a diol compound thereto with stirring. In these cases, a diol compound having a different structure from that of the diol compound constituting the above thermoplastic polyester resin can be added for depolymerization when a plurality of diol compounds are copolymerized to form a copolyester resin. As the diol compound used for depolymerization of a thermoplastic polyester resin, one or at least two of the same various diol compounds employed as a polymerizable monomer of the thermoplastic polyester resin is used. A catalyst necessary for reaction to prepare a polyester component having low polymerization degree is catalysts for transesterification, and it is possible to use one or at least two of metal oxide, carbonate, acetate, alcoholate and the like. In these methods of preparing a component having low polymerization degree by depolymerization of a thermoplastic polyester resin, a catalyst required for the reaction is already contained in the thermoplastic resin, which is an initial material in usual cases. However, the above catalysts for transesterification can be freshly added thereto, if necessary.

There is no particular limitation for the method of mixing the dispersion of layered phyllosilicate and water with a polymerizable pre-polymer of a thermoplastic polyester resin composition. Examples thereof are a method of making the polymerizable pre-polymer of the thermoplastic polyester resin into the state of melting and/or solution by using an extruder, a polymerization reactor or the like, adding, mixing and deaerating the dispersion of layered phyllosilicate and water by using a device for liquid addition or the like.

These can be mixed at any stage without any particular limitation for the timing. For example, the dispersion of layered phyllosilicate can be added at storing and preparing a polymerizable monomer of a thermoplastic polyester resin (in a monomer preparation bath), at transesterification reaction of the above polymerizable monomer (in a transesterification bath), and at the time when the material for transesterification is polymerized by condensation polymerization (in a polymerization bath). Mixing methods includes, for example, a method of batchwise mixing of a melted or solution polymerizable pre-polymer of a thermoplastic polyester resin with a dispersion of layered phyllosilicate and water, a method of adding dispersion of layered phyllosilicate and water continuously or successively, and other methods. In case of continuous or successive addition, adding rate of the dispersion of layered phyllosilicate and water is not particularly limited. However, the dispersion of layered phyllosilicate and water is added continuously or successively at a rate of 0.01 to 10.0 parts by weight per minute, preferably 0.03 to 8.0 parts by weight per minute, and more preferably 0.05 to 6.0 parts by weight per minute based on 100 parts by weight of the polymerizable pre-polymer of the thermoplastic polyester resin. Though the system temperature is not particularly limited, it is at least the melting point, preferably 80° C. to 280° C., more preferably 80° C. to 250° C., and most preferably 80° C. to 200° C. when the polymerizable pre-polymer is in the state of melting. It is not necessary to maintain a constant temperature as long as it is within the above temperature range. Therefore, margin of temperature fluctuation is not particularly limited, but is preferably at most 100° C., more preferably 80° C., and most preferably 50° C.

Though there are various methods for mixing as described above, it is more preferable when the polymerizable pre-polymer of the thermoplastic resin is in the state of melting at mixing from the viewpoints of productivity and system handling. Since no solvent is used, it is also preferable in terms of safety, environment and good hygiene. The method of continuous and successive addition of dispersion of layered phyllosilicate and water is more preferable from the viewpoints of dispersibility of layered phyllosilicate and improvement in properties of the resin composition to be obtained.

There can be a step for polymerizing a polymerizable pre-polymer of the above thermoplastic polyester resin as the step (C) in the process for preparing a polyester resin composition of the present invention. The polymerization can be performed according to general polymerization methods of thermoplastic polyester resins without any particular limitation therefor. Examples thereof are melt-polycondensation and solid phase polymerization.

In case of copolymerizing another diol component with the resin component, polymerization can be achieved by adding and mixing a desired diol compound at any time during melt-polycondensation and then by subsequent melt-polycondensation or solid phase polymerization. A catalyst necessary for the reaction is one or at least two of metal oxide, carbonate, acetate, alcoholate and the like according to need.

As to the molecular weight after the polymerization, the logarithmic viscosity measured at 25° C. by using phenol/tetrachloroethane (5/5 in weight ratio) mixed solvent is adjusted to 0.3 to 2.0 (dl/g), preferably 0.30 to 1.8 (dl/g), more preferably 0.30 to 1.5 (dl/g), most preferably 0.30 to 1.2 (dl/g). When the logarithmic viscosity is less than 0.3 (dl/g), mechanical properties tend to be low. Meanwhile, when it is more than 2.0 (dl/g), molding flowability tends to be lowered due to high melting viscosity.

The state of dispersion of the layered phyllosilicate can be controlled according to kind and ratio of polar solvent, use order thereof, stirring condition or the like when polar solvent is used in step (A), and according to kind and molecular weight of polymerizable pre-polymer and addition rate of dispersion of layered phyllosilicate and water in step (B).

In other words, when stirring strength and shear force are constant, and water and a polar solvent are used as a dispersion medium in step (A), states of swelling and exfoliating of layered phyllosilicate change depending upon kind, mixing ratio and mixing order of the polar solvent. For example, when montmorillonite is used as layered phyllosilicate and water alone is used as a dispersion medium, a dispersion of layered phyllosilicate and water can be prepared in which montmorillonite is swelled and cleft almost to the state of unit layers. The state of dispersion is controllable by performing steps (B) and (C) with maintaining these conditions. Meanwhile, a few to a hundred and tens of unit layers are laminated to prepare a dispersion of layered phyllosilicate and water containing layered phyllosilicate which has thickness of a few to a hundred and tens of pieces, when a mixed solvent of water and a polar solvent such as ethanol, tetrahydrofuran (THF), methyl ethyl ketone (MEK) and N-methylpyrrolidone (NMP) is used as a dispersion medium, or when montmorillonite is dispersed into the polar solvent and then water is added thereto. The state of dispersion is controllable by performing steps (B) and (C) with maintaining these conditions.

As to a process for preparing a polycarbonate resin containing layered phyllosilicate which is uniformly and finely dispersed in the thin plate-like shape, it is preferable to prepare the resin according to a process comprising, in succession to step (A) of preparing a dispersion of layered phyllosilicate and water containing layered phyllosilicate and water, step (E) of mixing a polymerizable pre-polymer of the polycarbonate resin with the above dispersion of layered phyllosilicate and water, and step (F) of polymerizing the polymerizable pre-polymer of the polycarbonate resin.

Step (A) is the same as above.

Mixing of the above dispersion of layered phyllosilicate and water with a polymerizable pre-polymer of a polycarbonate resin is conducted as step (E). Herein, the polymerizable pre-polymer of a polycarbonate resin means at least one of a polymerizable monomer or a component having low polymerization degree.

The polymerizable monomer of a thermoplastic polycarbonate resin includes bisphenols and carbonates. Herein, however, mention to those examples is omitted since detailed explanation is already given in the above.

The component having low polymerization degree of the polycarbonate resin refers to a condensate which is obtained by reaction of the above polymerizable monomer and which has a molecular weight such that melt viscosity enables uniform and satisfactory dispersion of a dispersion of layered phyllosilicate and water containing layered phyllosilicate in the state of melting.

The method of preparing the above component having low polymerization degree is not particularly limited. Though any of interfacial polymerization, pyridine method and transesterification can be adopted, the component having low polymerization degree obtained by transesterification is preferable among them. Additionally, a component having low polymerization degree can also be prepared by depolymerizing a polycarbonate resin.

Mixing method of the dispersion of layered phyllosilicate and water with the polymerizable pre-polymer is the same as the above step (B).

It is possible to carry out a step for polymerizing the polymerizable pre-polymer of polycarbonate resin as step (F). Although the polymerization can be performed according to general polymerization methods of polycarbonate resins without any particular limitation therefor, transesterification is preferably adopted from the viewpoint of workability.

According to the transesterification method, a bisphenol compound is added to a mixture containing a diester carbonate compound and the system is heated to about 280 to 300° C. with stirring sufficiently to conduct the esterification reaction in the state of melting. Examples of a catalyst necessary for the transesterification method are simple substance, oxide and hydroxide of alkaline metal or alkaline earth metal, amide compounds, alcoholate and phenolate, or at least one of $Sb_2O_3$, ZnO, PbO, an organic titanium compound, quaternary ammonium salt and the like.

As to the molecular weight after polymerization, the weight average molecular weight Mw, measured according to gel permeation chromatography (GPC) by using a tetrahydrofuran (THF) solvent at 40° C., is 15,000 to 80,000, more preferably 30,000 to 70,000 converted to mono-molecular weight distribution of polystyrene.

Melt-kneading can be performed according to general and conventional melt-kneaders. Examples thereof are a single-screwed extruder, a twin-screwed extruder, a Banbury mixer, a roll and the like, which are capable of inducing high shear force to the system. An interlock twin-screwed extruder equipped with a kneading disk is particularly preferable.

In case of adding fibrous filler, the process is not particularly limited. For example, the resin composition is prepared by melt-kneading a thermoplastic polyester resin, a layered phyllosilicate-containing polyester resin dispersed therein and the fibrous filler. The process for melt-kneading the layered phyllosilicate-containing polyester resin and the fibrous filler can be conducted according to usually used kneaders without any particular limitation. Examples of such kneaders include a single-screwed extruder, a twin-screwed extruder, a Banbury mixer, a roll and the like, which are capable of inducing high shear force to the system.

In case of adding a polycarbonate resin, the resin composition is prepared according to various methods without any particularly limitation. For example, there is a method of preparing a layered phyllosilicate-containing polyester resin in which layered phyllosilicate is uniformly and finely dispersed into a thermoplastic polyester resin in the thin plate-like shape beforehand, and then melt-kneading the same with a polycarbonate resin. On the contrary, there is also a method of preparing a layered phyllosilicate-containing polyester resin in which layered phyllosilicate is uniformly and finely dispersed into a polycarbonate resin in the thin plate-like shape beforehand, and then melt-kneading the same with a thermoplastic polyester resin. Another example is a method of melt-kneading the layered phyllosilicate-containing polyester resin and the layered phyllosilicate-containing polycarbonate resin.

Therefore, layered phyllosilicate may be dispersed in either or at least two of the resin layers comprising a thermoplastic resin composition.

It is possible to add impact modifiers to the thermoplastic resin composition of the present invention, such as polybutadiene, a butadiene-styrene copolymer, an acrylic rubber, an ionomer, an ethylene-propylene copolymer, an ethylene-propylene-diene copolymer, a natural rubber, a chlorinated butyl rubber, an α-olefin homopolymer and a copolymer of at least two α-olefins (which may include any of random, block or graft copolymer, or mixture thereof), or an impact modifier such as olefin elastomer, if necessary. These may be modified by acid compounds such as maleic anhydride or epoxy compounds such as glycidyl methacrylate.

Also, it is possible to use any other thermoplastic resin or thermosetting resin alone or in combination of two or more, such as a unsaturated polyester resin, a polyester carbonate resin, a liquid crystal polyester resin, a polyolefin resin, a polyamide resin, a styrene resin reinforced by a rubbery polymer, a polyphenylene sulfide resin, a polyphenylene ether resin, a polyacetal resin, a polysulfon resin and polyarylateresin within the range in which mechanical properties, moldability, heat resistance, dimensional stability and the like are not lost.

Furthermore, additives such as pigment, colorant, thermal stabilizer, antioxidant, ultraviolet ray absorber, light stabilizer, lubricant, plasticizer, flame retardant and antistatic agent can be added depending on the purpose. The thermoplastic resin composition of the present invention may be molded by injection molding or thermal press molding, or can be subjected to blow forming. Since molded articles to be obtained have excellent appearance, mechanical properties and heat deformation resistance, it is suitably applied, for example, for parts of automobiles, household electric appliances and precision machines, substrates for magnetic record tape, daily commodities, wrapping materials and other general materials for industrial use.

The present invention is more specifically explained by means of the following examples, but is not limited only to these examples.

Hereinafter, main materials used in Examples and Comparative Examples are collectively shown. These materials are not purified unless otherwise specified.

(Material)

Polyethylene terephthalate: PBK 2 available from Kanebo, Ltd. logarithmic viscosity ($\eta_{inh}$)=0.63 (dl/g) (hereinafter referred to as PET or PBK 2).

Polybutylene terephthalate: PBT 120 available from Kanebo, Ltd logarithmic viscosity ($\eta_{inh}$)=0.82 (dl/g) (hereinafter referred to as PBT).

Bishydroxyethyl terephthalate: NISSO-BHET available from Nisso Maruzen Chemicals Co., Ltd. (hereinafter referred to as BHET).

Dimethyl terephthalate: Wako high grade available from Wako Pure Chemical Industries Ltd. (hereinafter referred to as DMT).

Ethylene glycol: mono-ethylene glycol available from Nippon Shokubai Co., Ltd. (hereinafter referred to as EG).

Propylene glycol: propylene glycol (JIS reagent high grade) available from Wako Pure Chemical Industries Ltd.

1,4-butane diol: 1,4-butane diol available from Tosoh Corporation (hereinafter referred to as 1,4-BD).

Layered phyllosilicate: Kunipia F available from Kunimine Industries Co., Ltd. (montmorillonite, basal space=13 Å, hereinafter referred to as Kunipia F), ME 100 available from Coop Chemical Co., Ltd. (basal space=12 Å, hereinafter referred to as ME 100) and Bengel HVP (available from Houjun Yoko Kabushiki Kaisha) (basal space=13 Å, hereinafter referred to as Bengel HVP).

Fibrous fiber: glass fiber T-195H available from Nippon Electric Glass Co., Ltd. (hereinafter referred to as T195H) and carbon fiber Dona Carbo S-243 available from Osaka Gas Co., Ltd. (hereinafter referred to as S 243).

Dimethyl carbonate: dimethyl carbonate available from Wako Pure Chemical Industries Ltd. (hereinafter referred to as DMC).

Bisphenol A: bisphenol A available from Mitsui Chemicals, Inc. (hereinafter referred to as BPA).

Polycarbonate resin (PC resin): Tafron A2200 available from Idemitsu Petrochemical Co., Ltd. (hereinafter referred to as A2200).

Evaluation methods in Examples and Comparative Examples are summarized below:

(Measurement of Dispersion State)

A micro thin piece having thickness of 50 to 100 μm was used. The dispersion state of layered phyllosilicate was observed and photographed by using a transmission electron microscope (made by JEOL Ltd. JEM-1200) under accelerating voltage of 80 kv at a magnification of ×40,000 to 1,000,000. Then any region containing at least 100 particles was selected on an TEM image and layer thickness, layer length, the number of particles (value [N]) and equivalent area circle diameter [D] were measured, manually by using a graduated ruler, or by processing according to an image analysis device PIASIII made by Interquest Inc.

Average aspect ratio is defined as a number average value among the ratios of the layer length to the layer thickness of the layered phyllosilicate.

Value [N] was measured as follows. First, the number of particles of layered phyllosilicate present in the selected region was counted on the TEM image. Aside from this, ash content ratio of the resin composition derived from the layered phyllosilicate was measured. Value [N] was defined as a value obtained by dividing the above number of particles and converting it to the value for an area of 100 μm².

The average layer thickness was defined as a mean value of thickness of each layered phyllosilicate, while the maximum layer thickness was defined as the largest value of thickness of each layered phyllosilicate.

When dispersion particles are too large to be observed by TEM properly, the value [N] was measured by using a light microscope (Optical Microscope BH-2 available from Oympus Co., Ltd.) in the same manner as the above. However, the sample was melted at 250 to 270° C., if necessary, by using Hot stage THM600 available from LINKAM Co., Ltd. and dispersion of particles kept in the state of melting was observed. The aspect ratio of dispersion particles which did not disperse in the thin plate-like shape was defined as the value of long diameter/short diameter. Herein, the long diameter refers to the long side of a rectangle which is the minimum in area among those circumscribed to target particles, while the minor axis refers to the short side of the above rectangle which is the minimum in area in a microscopic image and the like.

The equivalent area circle diameter [D] was measured by processing according to an image analysis device PIASIII made by Interquest Inc.

(Equilibrium Compliance $J_{e0}$ and Zero Shear Viscosity $\eta_0$)

The polyester resin composition of the present invention was molded by heat press molding under conditions of temperature of 280° C. and pressure of 4.9×106 N/m² to obtain a 1.4-mm-thick sheet. A test specimen was obtained by cutting out a disc having a diameter of 25 mm from the obtained sheet. Next, creep compliance was measured at 280° C. by placing the above specimen between a cone and a plate, melting it at 280° C. under nitrogen stream, allowing it to stand for 5,000 seconds, and by twisting it clockwise with a constant stress of 50 N/m² by using a melt viscoelasticity analyzer of stress controlling type (DSR-2000 made by Rheometric Scientific Co., Ltd.).

The creep curve of the thus measured creep compliance J (t) represented by the equation (4):

$$J(t) = \gamma(t)/\sigma \quad (4)$$

was approximated by a line as represented by the equation (5):

$$J(t) = J_{e0} + t/\eta_0 \quad (5)$$

and equilibrium compliance $J_{e0}$ was calculated from the intercept of the line, while the zero shear viscosity $\eta_0$ was calculated from the slope of the line.

(Extensional Viscosity $\eta_e$ and Shear Viscosity $\eta$)

A twin capillary rheometer comprising two capillary rheometers (made by Rosand Precision CO., Ltd.) was used herein, and the both were equipped with a die of $L_1$=16 mm and $D_1$=1 mm (referred to as the long die) and a die of $L_2$=0.25 mm and $D_2$=1 mm (referred to as the short die), respectively. Their barrels and dies were adjusted to 280° C. and each die was supplied with a polyester resin in the same amount. After that, extrusion was carried out simultaneously, followed by measurement of pressure losses $p_1$ and $p_2$ within the shear rate range of 20 to 200 (1/s). Next, pressure loss $p_0$ for a die whose length is hypothetically 0 is calculated from the obtained pressure loss values according to the following equation (6):

$$p_0 = (p_2 \cdot L_1 - p_1 \cdot L_2)/(L_1 - L_2) \quad (6)$$

Herein, $p_1$ indicates the pressure loss measured by the long die, $p_2$ indicates the pressure loss measured by the short die, $L_1$ indicates the length of the long die, and $L_2$ indicates the length of the short die.

The extensional viscosity $\eta_e$ and the strain rate $\dot{\epsilon}$ are measured according to the following equations (7) and (8), respectively:

$$\eta_e = [9(n+1)^2 p_0^2]/32\eta\dot{\gamma}^2 \quad (7)$$

$$\dot{\epsilon} = 4\eta\dot{\gamma}^2/3(n+1)p_0 \quad (8)$$

wherein $\dot{\gamma}$ is shear rate and $\eta$ is shear viscosity.

The letter n indicates power low index represented by the following formula (9):

$$\eta = c\dot{\gamma}^{n-1} \quad (9)$$

wherein c indicates a constant number.

The relationship between shear rate and shear viscosity is approximated by the least squares method based on the following equation (10):

$$\eta = a\dot{\gamma}^p \quad (10)$$

to calculate a and p. Meanwhile, the relationship between shear rate and extensional viscosity is approximated by the least squares method based on the following equation (11):

$$\eta_e = b\dot{\epsilon}^q \quad (11)$$

to calculate b and q.

Difference $\eta_e$–3$\eta$ between $\eta_e$ at $\dot{\epsilon}$=100 (1/s) and 3$\eta$ at $\dot{\gamma}$=100 (1/s) is deemed as the index for strain curability in the present invention, and it was calculated by b·100$^q$–3 a·100$^p$.

(Heat Deformation Temperature)

The thermoplastic resin composition of the present invention was dried (at 140° C. for five hours). A test specimen having a size of about 10×100×6 mm was prepared by injection molding under conditions of resin temperature of 250 to 280° C., gauge pressure of about 10 MPa and injection speed of about 50% by using an injection molding machine whose clamping force is 75 t (IS-75E made by Toshiba Machine Co., Ltd.). Heat deformation temperature of the obtained test specimen was measured according to ASTM D-648 under load of 1.82 MPa. It can be said that the larger the value of the heat deformation temperature is, the better the heat resistance is.

(Flexural Property)

Flexural strength and flexural modulus of a test specimen prepared in the same manner as in case of measuring heat deformation temperature were measured according to ASTM D-790. It can be said that the larger the value of flexural strength and flexural modulus are, the better the flexural properties are.

(Warpage)

The thermoplastic resin composition of the present invention was dried (at 140° C. for five hours), and then a plate-like test specimen having a size of about 120×120×1 mm was prepared by injection molding under conditions of mold temperature of 50° C., resin temperature of 250 to 280° C., gauge pressure of about 10 MPa and injection speed of about 50% by using an injection molding machine whose clamping force is 75 t (IS-75E made by Toshiba Kikai K.K.). The plate-like specimen was placed on a plane, and by pressing one corner of the four, the longest distance from the plane to one of the remaining three corners was measured by using a caliper and the like. The four corners were pressed respectively, and a mean value was calculated by the obtained warpage values. It can be said that the smaller the value of warpage is, the better the dimensional accuracy is.

(Anisotropy)

JIS1 dumbbell specimen was used, which had thickness of about 3 mm and prepared under the same condition as in case of measuring heat deformation temperature. A piece about 7 mm×7 mm in size was cut from the center part of the dumbbell specimen. It was kept at 20° C. for five minutes by using SSC-5200 and TMA-120C made by Seiko Electron Co., Ltd., and then heated within a range of 20° C. to 150° C. at a temperature rising rate of 5° C./minute. Coefficient of linear expansion between 30 to 120° C. was measured at MD direction and TD direction, and the ratio therebetween (MD/TD) was regarded as anisotropy. It can be said that the more the anisotropy approaches to 1, the better the dimensional accuracy is.

(Surface Gloss)

Surface gloss of a plate specimen prepared under the same condition as in case of measuring warpage was measured. A relative value was determined at reflection angle of 60° with a standard plate of 50% by using a mini glossmaster made by ERICHSEN Co., Ltd. It can be said that the larger the surface gloss value is, the better the property is.

(Surface Property)

Center line roughness was measured by using the above dumbbell specimen according to a surface roughness meter, surfcom 1500A made by Tokyo Seimitsu Co., Ltd. The smaller value thereof indicates that the surface is smoother.

(Specific Gravity)

Specific gravity was measured by using the above dumbbell specimen according to an electron aerometer ED-120T made by Mirage Trade Co., Ltd.

(Coefficient of Linear Expansion)

JIS1 dumbbell specimen was used, which had thickness of about 3 mm and prepared under the same condition as in case of measuring heat deformation temperature. A piece having about 7 mm×7 mm in size was cut from the center part of the dumbbell specimen. It was kept at 20° C. for five minutes by using SSC-5200 and TMA-120C available from Seiko Electron Co., Ltd., and then heated within a range of 20° C. to 150° C. at a temperature rising rate of 5° C./minute. Coefficient of linear expansion between 30 to 120° C. was calculated.

(Mold Releasing Ability)

Injection molding was carried out under conditions of mold temperature of 120° C. and resin temperature of 250 to 280° C. by using an injection molding machine (made by Nikko Co., Ltd.) whose clamping force is 35 t and a mold for draft evaluation (a cylindrical, 30-mm long mold having diameter of 20 mm, specimen shape: draft angle=1°).

(Color Tone)

Color tone was visually observed by using the above dumbbell specimen.

(Central Linear Average Roughness)

Central linear roughness was measured by using the above dumbbell specimen according to a surface roughness meter, surfcom 1500A, made by Tokyo Seimitsu Co., Ltd.

(Logarithmic Viscosity)

The thermoplastic resin composition of the present invention was dried (at 140° C. for four hours), and then weighed precisely in amount of about 100 mg. Thereto was added 20 ml of a mixed solvent of phenol/1,1,2,2-tetrachloroethane (1/1 in weight ratio), and it was dissolved at 120° C. Viscosity of solution was measured at 25° C. for the PET type and at 20° C. for the PBT type by using Ubbelohde's viscometer and an automatic measuring machine (Viscotimer made by Lauda Co., Ltd.). Logarithmic viscosity ($\eta_{inh}$) was calculated from the following equation:

$$\eta_{inh} = \{\ln(t/t_0)\}/C$$

(wherein t indicates time of solution, $t_0$ indicates time of mixed solvent alone, and C indicates concentration (g/dl).

(Ash Content Ratio)

Ash content ratio of the thermoplastic resin derived from fibrous fiber and layered phyllosilicate was measured according to JIS K 7052.

EXAMPLE 1

Step (A)

A dispersion of layered phyllosilicate and water was prepared by mixing 3,000 g of ion exchange-water and 160 g of Kunipia F with stirring at 5,000 rpm for three minutes according to a wet mill (made by Nippon Seiki Co. Ltd.).

Step (B)

A reactor was charged with 3,000 g of BHET, and it was melted under a flow of dry nitrogen with stirring at 140° C. Next, BHET was mixed with a dispersion of layered phyllosilicate and water by gradually adding the dispersion of layered phyllosilicate and water with keeping the system at 140 to 150° C. and stirring at 180 rpm. The rate of addition was about 2,000 g/hour. Vaporized water was released outside the system.

Step (C)

After completing addition of the dispersion of layered phyllosilicate and water, temperature of the system was elevated gradually. When the temperature reached about 220 to 240° C. and about 70 to 80% of the water in the added dispersion of layered phyllosilicate and water was confirmed to be released outside the system, thereto were added 7.0 g of a hindered phenol stabilizer (ADK STAB AO60 available from Asahi Denka Kogyo K.K., hereinafter referred to as AO 60) and 0.6 g of antimony trioxide ($Sb_2O_3$), and the system was heated to 280° C. Afterheating, the system was depressurized (0.5 to 5.0 torr (0.0665 to 0.665 MPa)) to carry out melt-polycondensation.

The polyester resin composition obtained according to the above manner was evaluated. Results are shown in Table 1.

rpm for 15 minutes by using a wet mill (made by Nippon Seiki Co. Ltd.) to obtain a dispersion of layered phyllosilicate and water.

By carrying out step (B) and step (C) in the same manner as in Example 1, a thermoplastic resin composition was prepared and then evaluated. Results are shown in Table 1.

EXAMPLE 3

Step (A)

By using a high-speed stirring homogenizer (made by Nippon Seiki Co., Ltd.), a mixed solvent comprising 1,000 g of ion exchange water, 500 g of methanol and 500 g of ethylene glycol, and 160 g of Kunipia F were stirred and mixed at 5,000 rpm for 15 minutes. Thereto was added 1,000 g of ion exchange-water, and the mixture was stirred further and wet-milled at 5,000 rpm for 20 minutes by using a wet mill (made by Nippon Seiki Co., Ltd) to obtain a dispersion of layered phyllosilicate and water.

TABLE 1

|  |  |  | Ex. No. | | | | | | | |
|---|---|---|---|---|---|---|---|---|---|---|
|  |  |  | 1 | 2 | 3 | 4 | 5 | 6 | 7 | 8 |
| Step (A) | Ion exchange water (g) |  | 3000 | 2500 | 2000 | 1600 | 1600 | 3000 | 3000 | 2000 |
|  | MeOH (g) |  |  | 500 | 500 |  |  |  |  |  |
|  | EG (g) |  |  |  | 500 |  |  |  |  |  |
|  | Kunipia F (g) |  | 160 | 160 | 160 |  |  | 160 | 160 | 300 |
|  | ME100 (g) |  |  |  |  | 160 |  |  |  |  |
|  | Bengel HVP (g) |  |  |  |  |  | 160 |  |  |  |
| Step (B) | Poly- merizable Prepolymer | BHET (*1) (g) | 3000 | 3000 | 3000 | 3000 | 3000 |  |  | 3000 |
|  |  | DMT/EG (*2) (g) |  |  |  |  |  | 2400/1500 |  |  |
|  |  | PET/EG (*3) (g) |  |  |  |  |  |  | 2400/500 |  |
|  |  | Logarithmic viscosity (g/dl) | 0.05 | 0.05 | 0.05 | 0.05 | 0.05 | 0.07 | 0.12 | 0.05 |
|  | Rate of addition of water dispersion (g/h) |  | 2000 | 2000 | 2000 | 1400 | 1400 | 2000 | 800 | 2000 |
| Step (C) |  |  |  |  |  | Melt polycondensation | | | | |
| Logarithmic viscosity (g/dl) |  |  | 0.59 | 0.60 | 0.61 | 0.59 | 0.59 | 0.60 | 0.61 | 0.58 |
| Ash content ratio (% by weight) |  |  | 6.58 | 6.59 | 6.58 | 6.65 | 6.56 | 6.54 | 6.57 | 11.50 |
| Ratio of [D] ≦ 3000 Å (%) |  |  | 90 | 65 | 40 | 83 | 96 | 87 | 80 | 86 |
| Average value of [D] (Å) |  |  | 1090 | 2360 | 3400 | 1260 | 720 | 1160 | 1280 | 1120 |
| Number of dispersed particles [N] (number/% by weight · 100μ$^2$) |  |  | 132 | 44 | 30 | 122 | 208 | 116 | 94 | 129 |
| Average aspect ratio |  |  | 143 | 55 | 35 | 166 | 93 | 125 | 105 | 140 |
| Average layer thickness (Å) |  |  | 75 | 240 | 390 | 88 | 60 | 85 | 105 | 80 |
| Maximum layer thickness (Å) |  |  | 300 | 700 | 1350 | 350 | 250 | 380 | 500 | 320 |
| $J_{e0} \cdot \eta_0$ (second) |  |  | 2.5 | 1.6 | 1.2 | 2.5 | 2.2 | 2.4 | 2.4 | 3.5 |
| $\eta_0 - 3_\eta$(Pa · s) |  |  | 2477 | 1955 | 1526 | 2385 | 2899 | 2394 | 2110 | 3677 |
| $\Delta\eta_0$ (Pa · s) |  |  | 2240 | 1718 | 1289 | 2148 | 2662 | 2157 | 1873 | 3210 |
| Flexural strength (MPa) |  |  | 125 | 105 | 103 | 128 | 118 | 120 | 120 | 145 |
| Flexural modulus (MPa) |  |  | 6290 | 5070 | 4650 | 6250 | 5680 | 6080 | 6040 | 8050 |
| Heat deflection Temperature (° C.) |  |  | 215 | 190 | 188 | 216 | 210 | 208 | 207 | 231 |
| Warpage (mm) |  |  | <0.1 | 0.2 | 0.4 | <0.1 | <0.1 | <0.1 | <0.1 | <0.1 |
| Coefficient of linear expansion | MD | $10^{-5}$/° C. | 5.62 | 6.69 | 6.8 | 5.63 | 5.68 | 5.78 | 5.8 | 5.32 |
|  | TD | $10^{-5}$/° C. | 5.63 | 6.86 | 7.23 | 5.64 | 5.69 | 5.79 | 5.82 | 5.32 |
| Center line roughness (nm) |  |  | 22 | 60 | 85 | 21 | 15 | 22 | 22 | 32 |
| Mold releasing ability |  |  | ◉ | ○ | ○ | ◉ | ◉ | ◉ | ◉ | ◉ |

EXAMPLE 2

Step (A)

By using a high-speed stirring homogenizer (made by Nippon Seiki Co., Ltd.), a mixed solvent comprising 1,000 g of ion exchange water and 500 g of MeOH, and 160 g of Kunipia F were stirred and mixed at 5,000 rpm for 10 minutes. Thereto was added 1,500 g of ion exchange-water, and the mixture was stirred further and wet-milled at 5,000

By carrying out step (B) and step (C) in the same manner as in Example 1, a thermoplastic resin composition was prepared and then evaluated. Results are shown in Table 1.

EXAMPLE 4

Step (A)

A dispersion of layered phyllosilicate and water containing about 10% by weight of ME100 was prepared by mixing 1,600 g of ion exchange-water and 160 g of ME 100 with stirring at 6,000 rpm for 15 minutes according to a wet mill.

By carrying out step (B) and step (C) in the same manner as in Example 1 (the rate of addition of the dispersed body of layered phyllosilicate and water being about 1,400 g/hour in step (B)), a thermoplastic resin composition was prepared and then evaluated. Results are shown in Table 1.

EXAMPLE 5

A thermoplastic resin composition was prepared in the same manner as in Example 4 except for using Bengel HVP instead of ME 100, and then it was evaluated. Results are shown in Table 1.

EXAMPLE 6

Step (A)

A dispersion of layered phyllosilicate and water containing about 5% by weight of Kunipia F was prepared in the same manner as in Example 1.

Step (B)

A reactor was charged with 2,400 g of DMT, 1,500 g of EG, 7.0 g of AO60 and 0.60 g of $Ti(OBu)_4$. By transesterification of DMT and EG with stirring the mixture at reaction temperature of about 150 to 190° C. for about three hours, a PET component having low polymerization degree was prepared. The logarithmic viscosity of the obtained low-polymerization-degree component was 0.07 (dl/g).

By keeping the temperature to 170 to 190° C., stirring the mixture at 180 rpm and gradually adding the dispersion of layered phyllosilicate and water, the component having low polymerization degree was mixed with the dispersion of layered phyllosilicate and water. The rate of addition was about 2,000 g/hour. Vaporized water was released outside the system.

Step (C)

After completing addition of the dispersion of layered phyllosilicate and water, temperature of the system was elevated gradually. When the temperature reached about 220 to 240° C. and about 70 to 80% of the water in the added dispersion of layered phyllosilicate and water was confirmed to be released outside the system, 0.8 g of $Sb_2O_3$ was added thereto, and the mixture was heated to 280° C. Afterheating, depressurization was performed (0.5 to 5.0 torr (0.0665 to 0.665 MPa)) to carry out melt-polycondensation. The polyester resin composition obtained according to the above manner was evaluated. Results are shown in Table 1.

EXAMPLE 7

Step (A)

A dispersion of layered phyllosilicate and water containing about 5% by weight of Kunipia F was prepared in the same manner as in Example 1.

Step (B)

A reactor was charged with 2,400 g of PET, 500 g of EG and 7.0 g of AO60. A PET component having low polymerization degree was prepared by depolymerizing PET with stirring the mixture under dry nitrogen air at reaction temperature of 180 to 240° C. for about one and a half hours, and releasing excessive EG. The logarithmic viscosity of the obtained low-polymerization-degree component was 0.12 (dl/g). By keeping the temperature of low-polymerization-degree component to 210 to 230° C., stirring it at 100 to 180 rpm and gradually adding the dispersion of layered phyllosilicate and water, the component having low polymerization degree was mixed with the dispersion of layered phyllosilicate and water. The rate of addition was about 800 g/hour. Vaporized water was released outside the system.

Step (C)

After completing addition of the dispersion of layered phyllosilicate and water, temperature of the system was elevated to 280° C. upon confirming that about 70 to 80% of water in the added dispersion of layered phyllosilicate and water was released outside the system. Afterheating, the system was depressurized (0.5 to 5.0 torr (0.0665 to 0.665 MPa)) to carry out melt-polycondensation. The polyester resin composition obtained according to the above manner was evaluated. Results are shown in Table 1.

EXAMPLE 8

By using a wet mill, 5,600 g of ion exchange water and 300 g of Kunipia F were mixed with stirring at 5,000 rpm for three minutes. Thereafter, it was transferred to a stirring vessel which can be heated, and the mixture was heated with stirring at 100 rpm to evaporate 3,600 g of water. A dispersion of layered phyllosilicate and water containing about 13% by weight of Kunipia F was prepared.

By carrying out step (B) and step (C) in the same manner as in Example 1, a thermoplastic resin composition was prepared and then evaluated. Results are shown in Table 1.

EXAMPLE 9

Step (A)

A dispersion of layered phyllosilicate and water containing about 5% by weight of Kunipia F was prepared in the same manner as in Example 1.

Step (B)

A reactor was charged with 2,300 g of DMT, 1,500 g of 1,4-BD, 7.0 g of AO60 and 0.60 g of $Ti(OBu)_4$. By transesterification of DMT and 1,4-BD with stirring the mixture at reaction temperature of about 160 to 190° C. for about three hours, a PBT component having low polymerization degree was prepared. The logarithmic viscosity of the obtained low-polymerization-degree component was 0.09 (dl/g).

By keeping the temperature to 180 to 190° C., stirring the mixture at 180 rpm and gradually adding the dispersion of layered phyllosilicate and water, the component having low polymerization degree was mixed with the dispersion of layered phyllosilicate and water. The rate of addition was about 2,000 g/hour. Vaporized water was released outside the system.

Step (C)

After completing addition of the dispersion of layered phyllosilicate and water, temperature of the system was elevated gradually. When the temperature reached about 220 to 240° C. and about 70 to 80% of the water in the added dispersion of layered phyllosilicate and water was confirmed to be released outside the system, temperature was further elevated to 270° C. Afterheating, depressurization was performed (0.5 to 5.0 torr (0.0665 to 0.665 MPa)) to carry out melt-polycondensation. The polyester resin composition obtained according to the above manner was evaluated. Results are shown in Table 3.

COMPARATIVE EXAMPLE 1

A reactor was charged with 2,400 g of DMT, 1,500 g of EG, 7.5 g of AO60 and 0.60 g of Ti(OBu)$_4$. Transesterification of DMT and EG was performed with stirring the mixture at reaction temperature of about 150 to 190° C. for about three hours. Thereafter, 0.60 g of Sb$_2$O$_3$ was added thereto, melt-polycondensation was carried out at 270 to 280° C. under reduced pressure (0.8 to 5.0 torr (0.107 to 0.665 MPa)), and then a PET resin was prepared and evaluated. Results are shown in Table 2.

TABLE 2

|  | Com. Ex. No. | | | | | |
| --- | --- | --- | --- | --- | --- | --- |
|  | 1 | 2 | 3 | 4 | 5 | 6 |
| Kunipia F (g) |  | 160 | 160 | 160 | 160 | 256 |
| EG (g) | 1500 |  | 3000 | 3000 |  |  |
| 1,4-BD (g) |  |  |  |  |  |  |
| Ion Exchange water (g) |  |  |  |  |  | 768 |
| BHET (g) |  | 3000 | 3000 |  |  |  |
| DMT (g) | 2400 |  |  | 2400 |  |  |
| PET (g) |  |  |  |  | 2400 | 4000 |
| Preparation process |  | Melt polycondensation | | | Melt kneading | |
| Logarithmic viscosity (g/dl) | 0.63 | 0.63 | 0.62 | 0.62 | 0.63 | 0.60 |
| Ash content ratio (% by weight) | 0.00 | 6.60 | 6.59 | 6.59 | 6.60 | 6.60 |
| Ratio of [D] ≦ 3000 Å (%) | Not measured | 0 | 0 | 0 | 0 | 0 |
| Average value of [D] (Å) | Not measured | 26500 | 19500 | 21600 | 23100 | 18300 |
| Number of dispersed particles [N] (number/ % by weight · 100μ$^2$) | Not measured | 1 | 3 | 3 | 1 | 10 |
| Average aspect ratio (*1) | Not measured | 1.5 | 1.6 | 1.5 | 1.5 | 2.5 |
| Average layer thickness (*2) (Å) | Not measured | 32,000 | 3600 | 5400 | 30,000 | 2800 |
| Maximum layer thickness (*3) (Å) | Not measured | 900,000 | 8800 | 15,000 | 900,000 | 7900 |
| J$_{e0}$ · η$_0$ (second) | 0.20 | 0.21 | 0.23 | 0.21 | 0.20 | 0.20 |
| η$_0$ − 3η (Pa · s) | 175 | 182 | 185 | 180 | 178 | 178 |
| Δη$_0$ (Pa · s) | 244 | 250 | 256 | 249 | 246 | 246 |
| Flexural strength (MPa) | 104 | 103 | 104 | 103 | 104 | 105 |
| Flexural modulus (MPa) | 2970 | 3060 | 3240 | 3100 | 3080 | 3210 |
| Heat deflection Temperature (° C.) | 140 | 146 | 148 | 146 | 146 | 147 |
| Warpage (mm) | Cannot be measured (*4) | | | | | |
| Coefficient of linear expansion MD 10$^{-5}$/° C. | 7.41 | 7.39 | 7.38 | 7.39 | 7.40 | 7.39 |
| Coefficient of linear expansion TD 10$^{-5}$/° C. | 12.22 | 12.18 | 12.09 | 12.15 | 12.18 | 12.10 |
| Center line roughness (nm) | 20 | 806 | 668 | 724 | 826 | 652 |
| Mold releasing ability | X | X | X | X | X | X |

(*1): not dispersed in the state of plate; indicated by long diameter/ short diameter of dispersion particles
(*2): not dispersed in the state of plate; indicated by number average of short diameter of dispersion particles
(*3): not dispersed in the state of plate; indicated by the maximum of short diameter of dispersion particles
(*4): cannot be measured due to remarkable deformation of molded articles

TABLE 3

|  |  | Ex. No. | | | | |
| --- | --- | --- | --- | --- | --- | --- |
|  |  | 9 | 10 | 11 | Com. Ex. 7 | Com. Ex. 8 |
| Step (A) | Ion exchange water (g) | 3000 | 2300 | 1800 |  |  |
|  | EtOH (g) | 0 | 700 | 1200 |  |  |
|  | Kunipia F (g) | 160 | 160 | 160 |  |  |
| Step (B) | Polymerizable prepolymer DMT/BD (*1) (g) | 2300/1500 | 2300/1500 | 2300/1500 |  |  |
|  | Logarithmic viscosity (g/dl) | 0.09 | 0.09 | 0.09 |  |  |
|  | Rate of addition of water dispersion (g/h) | 2000 | 2000 | 2000 |  |  |
| Step (C) |  | Melt polycondensation | | |  |  |
| Kunipia F (g) |  |  |  |  | 0 | 160 |
| 1,4-BD (g) |  |  |  |  | 1500 | 3000 |
| DMT (g) |  |  |  |  | 2300 | 2300 |
| Logarithmic viscosity (g/dl) |  | 0.80 | 0.82 | 0.82 | 0.82 | 0.80 |
| Ash content ratio (% by weight) |  | 6.58 | 6.60 | 6.58 | 0.00 | 6.58 |
| Ratio of [D] ≦ 3000 Å (%) |  | 86 | 52 | 28 | Not measured | 0 |
| Average value of [D] (Å) |  | 1170 | 2850 | 4500 | Not measured | 21100 |
| Number of dispersed particles [N] (number/ % by weight · 100μ$^2$) |  | 115 | 41 | 30 | Not measured | 3 |
| Average aspect ratio |  | 124 | 45 | 18 | Not measured | 1.6(*2) |
| Average layer thickness (Å) |  | 88 | 280 | 460 | Not measured | 3100(*3) |
| Maximum layer Thickness (Å) |  | 380 | 860 | 1810 | Not measured | 8500(*4) |
| J$_{e0}$ · η$_0$ (second) |  | 2.8 | 1.2 | 0.9 | 0.25 | 0.26 |
| η$_0$ − 3η (Pa · s) |  | 2560 | 756 | 483 | 189 | 195 |
| Δη$_0$ (Pa · s) |  | 2341 | 1074 | 669 | 262 | 265 |

TABLE 3-continued

|  |  | Ex. No. | | | | |
| --- | --- | --- | --- | --- | --- | --- |
|  |  | 9 | 10 | 11 | Com. Ex. 7 | Com. Ex. 8 |
| Flexural strength (MPa) |  | 141 | 120 | 101 | 85 | 85 |
| Flexural modulus (MPa) |  | 5760 | 4610 | 3980 | 2610 | 2820 |
| Heat deflection Temperature (° C.) |  | 195 | 183 | 178 | 160 | 170 |
| Warpage (mm) |  | <0.1 | 0.4 | 0.7 | 10.9 | 10.8 |
| Coefficient of linear MD | $10^{-5}/°$ C. | 5.53 | 5.95 | 6.21 | 6.89 | 6.87 |
| expansion TD | $10^{-5}/°$ C. | 5.54 | 6.46 | 7.42 | 14.23 | 14.22 |
| Center line roughness (nm) |  | 22 | 60 | 95 | 20 | 809 |
| Mold releasing ability |  | ⊚ | ⊚ | ○ | ○ | ○ |

(*1): product by transesterification of DMT and 1,4-BD(1,4-BD-butanediol)
(*2): not dispersed in the state of plate; indicated by long diameter/ short diameter of dispersion particles
(*3): not dispersed in the state of plate; indicated by number average of short diameter of dispersion particles
(*4): not dispersed in the state of plate; indicated by the maximum of short diameter of dispersion particles

COMPARATIVE EXAMPLE 2

In the same manner as in Example 1, 3,000 g of BHET was melted. The temperature was kept to 140 to 150° C., and 160 g of Kunipia F was gradually added thereto with stirring at 180 rpm. Then 7.0 g of AO60 and 0.8 g of $Sb_2O_3$ were added thereto. After the temperature was elevated to 280° C., the system was depressurized (0.5 to 5.0 torr) to carry out melt-polycondensation. Results are shown in Table 2.

COMPARATIVE EXAMPLE 3

A mixture was prepared by mixing 3,000 g of EG and 160 g of Kunipia F with stirring at 5,000 rpm for three minutes by using a wet mill (made by Nippon Seiki Co., Ltd.).

Next, with stirring at 180 rpm 3,000 g of BHET melted in the same manner as in Example 1 whose temperature was kept to 140 to 150° C., the above mixture was gradually added thereto. The rate of addition was about 2,000 g/hour. Then 7.0 g of AO60 and 0.8 g of $Sb_2O_3$ were added thereto, the temperature was elevated to 280° C., and the system was depressurized (0.5 to 5.0 torr (0.0665 to 0.665 MPa)) to carry out melt-polycondensation. Results are shown in Table 2.

COMPARATIVE EXAMPLE 4

A reactor was charged with a mixture comprising EG and Kunipia F which was prepared in the same manner as in Comparative Example 2, 2,400 g of DMT, 7.0 g of AO60 and 0.60 g of $Ti(OBu)_4$. By transesterification of DMT and EG with stirring the mixture at reaction temperature of about 160 to 190° C. for about three hours, a PET component having low polymerization degree was prepared in the presence of Kunipia F. The logarithmic viscosity of the obtained low-polymerization-degree component was 0.07 (dl/g). Next, temperature of the mixture was elevated. When it reached about 240° C., 0.8 g of $Sb_2O_3$ was added thereto and the temperature was further elevated to 280° C. After heating, it was depressurized and melt-polycondensation was performed. Results are shown in Table 2.

COMPARATIVE EXAMPLE 5

Dry-blending of 2,400 g of PET, 160 g of Kunipia F and 7.0 g of AO60 was carried out. Next, the dry-blended mixture was melted and kneaded under conditions of 250 to 270° C. and rotation speed of 100 rpm by using a twin-screw extruder (LOBOTEX 30 made by The Japan Steel Works, Ltd.). Results are shown in Table 2.

COMPARATIVE EXAMPLE 6

By applying supersonic wave, 768 g of ion exchange water was mixed with 256 g of Kunipia F to swell Kunipia F.

A twin-screw extruder (TEX 44 made by The Japan Steel Works Ltd.) was used to melt and knead 4,000 g of PET and the above mixture under conditions of 250 to 270° C. and rotation speed of 350 rpm. Vaporized water was removed under reduced pressure through a vent. Results are shown in Table 2.

COMPARATIVE EXAMPLE 7

A reactor was charged with 2,300 g of DMT, 1,500 g of 1,4-BD, 7.5 g of AO60 and 0.60 g of $Ti(OBu)_4$. Transesterification of DMT and 1,4-BD was performed with stirring the mixture at reaction temperature of about 140 to 180° C. for about three hours. Thereafter, melt-polycondensation was carried out at reaction temperature of 250 to 270° C. under reduced pressure (0.8 to 5.0 torr (0.107 to 0.665 MPa)) to prepare a PET resin. Results are shown in Table 3.

COMPARATIVE EXAMPLE 8

A mixture was prepared by mixing 3,000 g of 1,4-BD and 160 g of Kunipia F with stirring at 5,000 rpm for three minutes by using a wet mill (made by Nippon Seiki Co., Ltd.). A reactor was charged with 2,300 g of DMT, the above mixture, 7.0 g of AO60 and 0.60 g of $Ti(OBu)_4$. By transesterification of DMT and 1,4-BD with stirring the mixture at reaction temperature of about 160 to 190° C. for about three hours, a PET component having low polymerization degree was prepared in the presence of Kunipia F. The logarithmic viscosity of the obtained low-polymerization-degree component was 0.08 (dl/g). The temperature was elevated to 270° C., and then it was depressurized (0.5 to 5.0 torr (0.0665 to 0.665 MPa)) to carry out melt-polycondensation. Results are shown in Table 3.

TABLE 4

|  |  |  | Ex. No. | | | | |
|---|---|---|---|---|---|---|---|
|  |  |  | 12 | 13 | 14 | Com. Ex. 9 | Com. Ex. 10 |
| Step (A) | Ion exchange water (g) |  | 1600 | 1250 | 1070 |  |  |
|  | EtOH (g) |  |  | 350 | 530 |  |  |
|  | ME100 (g) |  | 160 | 160 | 160 |  |  |
| Step (B) | Poly-merizable Prepolymer | DMT/PG (*1) (g) | 2300/1750 | 2300/1750 | 2300/1750 |  |  |
|  |  | Logarithmic viscosity (g/dl) | 0.08 | 0.08 | 0.08 |  |  |
|  | Rate of addition of water dispersion (g/h) |  | 1400 | 1400 | 1400 |  |  |
| Step (C) |  |  | Melt polycondensation | | |  |  |
| ME100 (g) |  |  |  |  |  | 0 | 160 |
| Propylene glycol (g) |  |  |  |  |  | 1750 | 3000 |
| DMT (g) |  |  |  |  |  | 2300 | 2300 |
| Logarithmic viscosity (g/dl) |  |  | 0.71 | 0.72 | 0.72 | 0.73 | 0.80 |
| Ash content ratio (% by weight) |  |  | 6.62 | 6.64 | 6.65 | 0.00 | 6.58 |
| Ratio of [D] ≦ 3000 Å (%) |  |  | 79 | 70 | 35 | Not measured | 0 |
| Average value of [D] (Å) |  |  | 1430 | 2110 | 4230 | Not measured | 25400 |
| Number of dispersed particles [N] (number/ % by weights · 100μ$^2$) |  |  | 107 | 85 | 50 | Not measured | 2 |
| Average aspect ratio |  |  | 151 | 116 | 27 | Not measured | 1.5(*2) |
| Average layer thickness (Å) |  |  | 95 | 117 | 410 | Not measured | 4500(*3) |
| Maximum layer thickness (Å) |  |  | 410 | 600 | 1630 | Not measured | 10500(*4) |
| $J_{e0} \cdot \eta_0$ (second) |  |  | 2.7 | 2.3 | 0.9 | 0.23 | 0.24 |
| $\eta_0 - 3\eta$ (Pa · s) |  |  | 2460 | 2105 | 512 | 180 | 184 |
| $\Delta\eta_0$ (Pa · s) |  |  | 2210 | 1860 | 721 | 254 | 260 |
| Flexural strength (MPa) |  |  | 127 | 120 | 101 | 2950 | 3120 |
| Flexural modulus (MPa) |  |  | 5840 | 5130 | 4230 | 108 | 112 |
| Heat deflection temperature (° C.) |  |  | 203 | 196 | 182 | 180 | 184 |
| Warpage (mm) |  |  | <0.1 | 0.2 | 0.6 | Cannot be measured (*5) | 11.1 |
| Coefficient of linear expansion | MD | $10^{-5}/°$ C. | 5.79 | 6.01 | 6.92 | 7.12 | 6.89 |
|  | TD | $10^{-5}/°$ C. | 5.85 | 6.24 | 7.48 | 11.58 | 11.45 |
| Center line roughness (nm) |  |  | 22 | 30 | 90 | 22 | 826 |
| Mold releasing ability |  |  | ⊚ | ⊚ | ○ | X | Δ |

(*1): product by transesterification of DMT and propylene glycol
(*2): not dispersed in the state of plate; indicated by long diameter/ short diameter of dispersion particles
(*3): not dispersed in the state of plate; indicated by number average of short diameter of dispersion particles
(*4): not dispersed in the state of plate; indicated by the maximum of short diameter of dispersion particles
(*5): cannot be measured due to remarkable deformation

EXAMPLES 10 TO 11

Ion exchange water, ethanol and Kunipia F were stirred and mixed in each amount shown in Table 3 at 5,000 rpm for 15 minutes by using a high-speed stirring homogenizer (made by Nippon Seiki Co., Ltd.).

Step (B) and step (C) were carried out in the same manner as in Example 9 and a polyester resin composition was prepared and observed.

EXAMPLE 12

Step (A)

A dispersion of layered phyllosilicate and water containing 10% by weight of ME 100 was obtained in the same manner as in Example 4.

Step (B)

A reactor was charged with 2,300 g of DMT, 1,750 g of propylene glycol, 7.0 g of AO60 and 0.60 g of Ti(OBu)$_4$. By transesterification of DMT and propylene glycol with stirring the mixture at reaction temperature of about 150 to 200° C., a component having low polymerization degree of polypropylene terephthalate (PPT) was prepared. The logarithmic viscosity of the obtained low-polymerization-degree component was 0.08 (dl/g).

By keeping the temperature to 180 to 190° C., stirring the mixture at 180 rpm and gradually adding the dispersion of layered phyllosilicate and water, the component having low polymerization degree was mixed with the dispersion of layered phyllosilicate and water. The rate of addition was about 1,400 g/hour. Vaporized water was released outside the system.

Step (C)

After completing addition of the dispersion of layered phyllosilicate and water, temperature of the system was elevated gradually. When the temperature reached about 220 to 240° C. and 70 to 80% of water in the added dispersion of layered phyllosilicate and water was confirmed to be released outside the system, 0.5 g of Sb$_2$O$_3$ was added thereto and the temperature was further elevated to 270° C. After heating, it was depressurized (0.8 to 5.0 torr (0.107 to 0.665 MPa)) followed by melt-polycondensation, and then a polyester resin composition was obtained and evaluated.

EXAMPLES 13 TO 14

Step (A)

Ion exchange water, ethanol and ME100 in each amount shown in Table 4 were stirred and mixed at 5,000 rpm for 15 minutes by using a high-speed stirring homogenizer (made by Nippon Seiki Co., Ltd.). Step (B) and step (C) were carried out in the same manner as in Example 12, and a polyester resin composition was prepared and observed.

COMPARATIVE EXAMPLE 9

A reactor was charged with 2,300 g of DMT, 1,750 g of propylene glycol, 7.5 g of AO60 and 0.60 g of Ti(OBu)$_4$. DMT and propylene glycol were transesterified with stirring the mixture at reaction temperature of about 150 to 200° C. Thereafter, 0.5 g of Sb$_2$O$_3$ was added thereto, melt-polycondensation was carried out at reaction temperature of 250 to 270° C. under reduced pressure (0.8 to 5.0 torr (0.107 to 0.665 MPa)), and then a PPT resin was prepared and evaluated.

COMPARATIVE EXAMPLE 10

A mixture was prepared by mixing 3,000 g of propylene glycol and 160 g of ME 100 with stirring at 5,000 rpm for three minutes by using a wet mill (made by Nippon Seiki Co., Ltd.). A reactor was charged with 2,300 g of DMT, the above mixture, 7.0 g of AO60 and 0.60 g of Ti(OBu)$_4$. By transesterification of DMT and polyethylene glycol with stirring the mixture at reaction temperature of about 150 to 200° C., a PPT component having low polymerization degree was prepared in the presence of ME 100. The logarithmic viscosity of the obtained low-polymerization-degree component was 0.07 (dl/g). Next, Sb$_2$O$_3$ was added thereto, the temperature was elevated to 270° C., and then the system was depressurized (0.8 to 5.0 torr (0.107 to 0.665 MPa)) to carry out melt-polycondensation.

COMPARATIVE EXAMPLE 11

To 3,000 g of ion exchange water was added 160 g of montmorillonite, and they were mixed with stirring at 5,000 rpm for five minutes by using a wet mill made by Nippon Seiki Co., Ltd. Thereto was added 16 g of γ-(2-aminoethyl) aminopropyl trimethoxysilane (A-1120 available from Nippon Unicar Co., Ltd.), followed by further stirring for two hours to prepare a dispersion. Next, a reactor was charged with the above dispersion and 3,000 g of BHET, and water was removed with stirring at 100 to 150° C. After removing water, temperature of the system was elevated gradually. When it reached about 220 to 240° C., 7.0 g of AO60 and 0.6 g of Sb$_2$O$_3$ were added and the temperature was further elevated to 280° C. Afterheating, the system was depressurized (0.5 to 5.0 torr), followed by melt-polycondensation to prepare a resin composition. When color tone of the resin was visually evaluated in comparison with that of the polyester resin composition prepared in Example 1, the specimen remarkably took on brown because a silane compound was used in Comparative Example 9. No such coloration was observed in the specimen of Example 1. Results are shown in Table 5.

TABLE 5

|  |  |  | Ex. 1 | Com. Ex. 11 |
|---|---|---|---|---|
| Step (A) | Ion exchange water (g) |  | 3000 | 3000 |
|  | Kunipia F (g) |  | 160 | 160 |
|  | A1120 (g) |  |  | 16 |
| Step (B) | Polymerizable | BHET (*1)(g) | 3000 | 3000 |
|  | Prepolymer | Logarithmic viscosity (g/dl) | 0.05 | 0.05 |
|  | Rate of addition of water |  | 2000 | Mixed batchwise |
|  | Dispersion (g/h) |  |  | To remove water |
| Step (C) |  |  | Melt polycondensation |  |
| Coloration |  |  | Very light gray | Brown |

(*1): BHET: bishydroxyethyl terephthalate

EXAMPLE 15

A polyester resin composition was obtained in the same manner as in Example 1. The obtained polyester resin composition was dried at 140° C. for five hours and a specimen having a size of about 10×100×6 mm was prepared by using an injection molding machine whose clamping force is 75 t. The prepared specimen was pulverized, dried and injection molded in the same conditions as the above to prepare a similar specimen. This recycling process was repeated for five times and flexural modulus and flexural strength of the specimen were measured after each repetition according to ASTM D-790.

TABLE 6

|  | Ex. 15 | | | | | |
|---|---|---|---|---|---|---|
|  | Original specimen | Number of recycling operations | | | | |
|  |  | 1 | 2 | 3 | 4 | 5 |
| Ash content ratio (% by weight) | 6.58 | 6.59 | 6.58 | 6.57 | 6.58 | 6.57 |
| Ratio of [D] ≦ 3000 Å (%) | 90 | 90 | 91 | 90 | 91 | 90 |
| Average value of [D] (Å) | 1090 | 1080 | 1080 | 1050 | 1050 | 1040 |
| Number of dispersed particles [N] (number/ % by weight · 100μ$^2$) | 132 | 135 | 133 | 135 | 136 | 137 |
| Average aspect ratio | 143 | 141 | 141 | 141 | 140 | 139 |
| Average layer thickness (Å) | 75 | 76 | 74 | 74 | 72 | 72 |
| Maximum layer thickness (Å) | 300 | 300 | 300 | 280 | 280 | 250 |
| J$_{e0}$ · η$_0$ (second) | 2.5 | 2.5 | 2.5 | 2.6 | 2.6 | 2.6 |
| η$_0$ − 3η (Pa · s) | 2477 | 2456 | 2451 | 2447 | 2443 | 2439 |
| Δη$_0$ (Pa · s) | 2240 | 2228 | 2219 | 2207 | 2198 | 2150 |
| Flexural strength (MPa) | 125 | 124 | 124 | 121 | 120 | 120 |
| Flexural modulus (MPa) | 6290 | 6280 | 6350 | 6340 | 6320 | 6300 |
| Heat deflection temperature (° C.) | 215 | 215 | 214 | 214 | 214 | 213 |
| Warpage (mm) | <0.1 | <0.1 | <0.1 | <0.1 | <0.1 | <0.1 |
| Coefficient of linear expansion MD 10$^{-5}$/° C. | 5.62 | 5.64 | 5.64 | 5.67 | 5.66 | 5.69 |
| TD 10$^{-5}$/° C. | 5.63 | 5.65 | 5.66 | 5.68 | 5.67 | 5.72 |

TABLE 6-continued

| | Com. Ex. 12 | | | | | |
|---|---|---|---|---|---|---|
| | Original specimen | Number of recycling operations | | | | |
| | | 1 | 2 | 3 | 4 | 5 |
| Ash content ratio (% by weight) | 14.5 | 14.5 | 14.4 | 14.5 | 14.5 | 14.4 |
| Ratio of [D] ≦ 3000 Å (%) | Not measured | Not measured | Not measured | Not measured | Not measured | Not measured |
| Average value of [D] (Å) | | | | | | |
| Number of dispersed particles [N] (number/ % by weight · 100μ$^2$) | | | | | | |
| Average aspect ratio | | | | | | |
| Average layer thickness (Å) | | | | | | |
| Maximum layer thickness (Å) | | | | | | |
| $J_{e0} \cdot \eta_0$ (second) | | | | | | |
| $\eta_0 - 3\eta$ (Pa · s) | | | | | | |
| $\Delta\eta_0$ (Pa · s) | | | | | | |
| Flexural strength (MPa) | 132 | 121 | 110 | 105 | 103 | 102 |
| Flexural modulus (MPa) | 6250 | 5440 | 4720 | 4100 | 3570 | 3210 |
| Heat deflection temperature (° C.) | 231 | 208 | 192 | 185 | 180 | 178 |
| Warpage (mm) | 15.6 | 12.3 | 10.4 | 9.6 | 8.2 | 7.1 |
| Coefficient of linear expansion MD $10^{-5}$/° C. | 2.58 | 4.12 | 5.18 | 5.96 | 6.78 | 7.45 |
| TD $10^{-5}$/° C. | 8.56 | 9.75 | 10.62 | 11.36 | 11.95 | 12.42 |

COMPARATIVE EXAMPLE 12

Dry-blending of 4,000 g of PET, 400 g of glass fiber (available from Nippon Electric Glass Co., Ltd.) and 8.0 g of AO60 was carried out. Next, the mixture was melted and kneaded under conditions of 250 to 270° C. and rotation speed of 100 rpm by using a twin-screw extruder (LOBO-TEX 30 made by The Japan Steel Works, Ltd.). The melted and kneaded material was subjected to recycling processes in the same manner as in Example 15, and flexural modulus and flexural strength of the specimen were measured after each repetition according to ASTM D-790.

EXAMPLES 16 TO 17

By using a wet mill, 10 L of ion exchange water and 220 g of ME 100 shown in Table 7 were mixed and heated to 80° C. With stirring at constant temperature of 80° C., 4,000 g of BHET was continuously added thereto and the mixture was dissolved to prepare a mixture solution. The mixture solution was dried and powdered by using a spray drier (FOC 16 made by Okawara Kakoki Co., Ltd.). Air blasting temperature was set to 280° C., while outlet temperature was set to 80° C. Thereto was added 3,500 g of the obtained powder, 7.5 g of AO60 and 0.45 g of $Sb_2O_3$. Then by polymerizing polyethylene terephthalate (PET) according to melt-polycondensation reaction at polymerization reaction temperature of 280° C. under reduced pressure, a thermoplastic polyester resin composition containing layered phyllosilicate was prepared. The logarithmic viscosity of the PET in the thermoplastic polyester resin composition containing layered phyllosilicate was 0.62 (dl/g).

TABLE 7

| | Ex. 16 | Ex. 17 |
|---|---|---|
| Ion exchange water (g) | 10000 | 10000 |
| ME 100 (g) | 220 | 440 |
| Polymerizable prepolymer (g) (*1) | 4000 | 4000 |
| Preparation | Spray dry Melt polycondensation | |
| Logarithmic viscosity (g/dl) | 0.62 | 0.59 |

TABLE 7-continued

| | Ex. 16 | Ex. 17 |
|---|---|---|
| Ash content ratio (% by weight) | 6.58 | 12.75 |
| Ratio of [D] ≦ 3000 Å (%) | 87 | 84 |
| Average value of [D] (Å) | 1090 | 1160 |
| Number of dispersed particles [N] (number/% by weight · 100μ$^2$) | 128 | 120 |
| Average aspect ratio | 146 | 135 |
| Average layer thickness (Å) | 82 | 89 |
| Maximum layer thickness (Å) | 350 | 410 |
| $J_{e0} \cdot \eta_0$ (second) | 2.9 | 4.1 |
| $\eta_0 - 3\eta$ (Pa · s) | 2720 | 3890 |
| $\Delta\eta_0$ (Pa · s) | 2463 | 4030 |
| Flexural strength (MPa) | 131 | 135 |
| Flexural modulus (MPa) | 6340 | 8850 |
| Heat deflection Temperature (° C.) | 215 | 230 |
| Warpage (mm) | <0.1 | <0.1 |
| Coefficient of linear expansion MD $10^{-5}$/° C. | 5.58 | 5.32 |
| TD $10^{-5}$° C. | 5.59 | 5.33 |
| Center line roughness (nm) | 22 | 22 |
| Mold releasing ability | ◎ | ◎ |

(*1) Bishydroxyethyl terephthalate

PREPARATION EXAMPLE 1

A dispersion of layered phyllosilicate and water containing about 5% by weight of Kunipia F was prepared by stirring and mixing 3,500 g of ion exchange water and 185 g of Kunipia F at 5,000 rpm for ten minutes by using a wet mill (made by Nippon Seiki Co., Ltd.).

A reactor was charged with 3,000 g of BHET, and it was melted under a flow of dry nitrogen with stirring at 140° C. Next, BHET and a dispersion of layered phyllosilicate and water were mixed by gradually adding the dispersion of layered phyllosilicate and water with keeping the system at 150 to 170° C. and stirring at 150 rpm. The rate of addition was about 2,000 g/hour. Vaporized water was released outside the system.

After completing addition of the dispersion of layered phyllosilicate and water, temperature of the system was elevated gradually. When the temperature reached about 220 to 240° C. and about 70 to 80% of the water in the added dispersion of layered phyllosilicate and water was confirmed to be released outside the system, 7.0 g of a hindered phenol stabilizer (ADK STAB AO60 available from Asahi Denka Kogyo K.K., hereinafter referred to as AO 60) and 0.6 g of antimony trioxide ($Sb_2O_3$) were added thereto, and temperature of the system was further elevated to 280° C. Afterheating, the system was depressurized (0.5 to 5.0 torr), followed by melt-polycondensation, and then a polyester resin composition containing layered phyllosilicate was obtained (the same manner is also used through Preparation Examples 2 to 6).

The amounts of materials are shown in Table 8

TABLE 8

| | | Preparation Ex. No. | | | | | |
|---|---|---|---|---|---|---|---|
| | | 1 | 2 | 3 | 4 | 5 | 6 |
| Dispersion of water and layered phyllosilicate | Ion exchange water (g) | 3500 | 3500 | 3500 | 2000 | 3500 | 3500 |
| | Kunipia F (g) | 185 | | | 75 | | 185 |
| | ME100 (g) | | 185 | | | | |
| | Bengel HIVP (g) | | | 185 | | | 350 |
| | Rate of addition (g/h) | 2000 | 2000 | 2000 | 2000 | 1500 | 1800 |
| Polymerizable prepolymer | BHET (g) | 3000 | 3000 | 3000 | 3000 | 3000 | |
| | DMT (g) | | | | | | 2200 |
| | 1,4-BD (g) | | | | | | 1500 |
| Polymerization | | Melt polycondensation | | | | | |

PREPARATION EXAMPLE 2

A polyester resin containing layered phyllosilicate was prepared in the same manner as in Preparation Example 1 except for using 185 g of ME 100 instead of Kunipia F.

PREPARATION EXAMPLE 3

A polyester resin containing layered phyllosilicate was prepared in the same manner as in Preparation Example 1 except for using 185 g of Bengel HVP instead of Kunipia F.

PREPARATION EXAMPLE 4

A polyester resin containing layered phyllosilicate was prepared in the same manner as in Preparation Example 1 except that the amounts of ion exchange water and Kunipia F were changed to 2,000 g and 75 g, respectively.

PREPARATION EXAMPLE 5

A polyester resin containing layered phyllosilicate was prepared in the same manner as in Preparation Example 1 except for using 350 g of Bengel HVP instead of Kunipia F (however, addition rate of dispersion of layered phyllosilicate and water is 1,500 g/hour).

PREPARATION EXAMPLE 6

A dispersion of layered phyllosilicate and water containing about 5% by weight of Kunipia F was prepared in the same manner as in Preparation Example 1.

A reactor was charged with 2,200 g of DMT, 1,500 g of 1,4-BD, 7.0 g of AO60 and 0.60 g of $Ti(OBu)_4$. By transesterification of DMT and 1,4-BD with stirring the mixture at reaction temperature of about 160 to 190° C. for about three hours, a PBT component having low polymerization degree was prepared. The logarithmic viscosity of the obtained low-polymerization-degree component was 0.09 (dl/g).

By keeping the temperature to 180 to 190° C., stirring the mixture at 180 rpm and gradually adding the dispersion of layered phyllosilicate and water, the component having low polymerization degree was mixed with the dispersion of layered phyllosilicate and water. The rate of addition was about 1,800 g/hour. Vaporized water was released outside the system.

After completing addition of the dispersion of layered phyllosilicate and water, temperature of the system was elevated gradually. When the temperature reached about 220 to 240° C. and about 70 to 80% of water in the added dispersion of layered phyllosilicate and water was confirmed to be released outside the system, the temperature was further elevated to 270° C. Afterheating, it was depressurized (0.5 to 5.0 torr) followed by melt-polycondensation, and then a polyester resin composition containing layered phyllosilicate was obtained.

EXAMPLE 18

By using a twin screw extruder (LOBOTEX 30 made by The Japan Steel Works, Ltd.), 2,250 g of the layered phyllosilicate-containing polyester resin obtained in Preparation Example 1 and 250 g of T195H were melted and kneaded under conditions of pre-determined temperature of 260 to 280° C. and rotation speed of 100 rpm. A reinforced polyester resin composition was obtained therefrom and evaluated. Results are shown in Table 9 (the same manner is also used through Examples 19 to 24)

TABLE 9

| | | Ex. No. | | | | | | |
|---|---|---|---|---|---|---|---|---|
| | | 18 | 19 | 20 | 21 | 22 | 23 | 24 |
| Polyester resin containing layered phyllosilicate | a (g) (*1) | 2250 | | | | | 2250 | |
| | b (g) (*2) | | 2250 | | | | | |
| | c (g) (*3) | | | 2250 | | | | |
| | d (g) (*4) | | | | 2250 | | | |
| | e (g) (*5) | | | | | 2250 | | |
| | f (g) (*6) | | | | | | | 2250 |
| | Ash content ratio (% by weight) (*7) | 7.54 | 7.55 | 7.64 | 3.12 | 13.11 | 7.54 | 7.54 |

TABLE 9-continued

| | | Ex. No. | | | | | | |
|---|---|---|---|---|---|---|---|---|
| | | 18 | 19 | 20 | 21 | 22 | 23 | 24 |
| Fibrous filler | T195H (g) | 250 | 250 | 250 | 100 | 400 | | 250 |
| | S243 (g) | | | | | | 250 | |
| Logarithmic viscosity (g/dl) | | 0.60 | 0.60 | 0.60 | 0.62 | 0.58 | 0.60 | 0.80 |
| Ash content ratio (*8) (% by weight) | | 16.72 | 16.75 | 16.87 | 7.21 | 26.22 | 16.72 | 16.73 |
| Ratio of [D] ≦ 3000 Å (%) | | 91 | 85 | 94 | 92 | 88 | 90 | 86 |
| Average value of [D] (Å) | | 1080 | 1260 | 790 | 1050 | 850 | 1080 | 1110 |
| Number of dispersed particles [N] (number/% by weight · 100μ$^2$) | | 135 | 124 | 210 | 137 | 198 | 130 | 140 |
| Average aspect ratio | | 146 | 127 | 103 | 142 | 97 | 145 | 145 |
| Average layer thickness (Å) | | 74 | 94 | 60 | 76 | 65 | 75 | 76 |
| Maximum layer thickness (Å) | | 300 | 380 | 250 | 310 | 290 | 300 | 310 |
| Flexural strength (MPa) | | 175 | 168 | 165 | 121 | 120 | 188 | 210 |
| Flexural modulus (MPa) | | 8690 | 8590 | 8510 | 5410 | 12070 | 9650 | 7180 |
| Heat deflection Temperature (° C.) | | 240 | 238 | 237 | 208 | 247 | 245 | 216 |
| Warpage (mm) | | 3.8 | 4.2 | 3.7 | 3.1 | 4.8 | 3.9 | 1.1 |
| Anisotropy (Coefficient of linear expansion MD/TD) | | 0.65 | 0.64 | 0.64 | 0.73 | 0.59 | 0.67 | 0.63 |
| Gloss (%) | | 91.4 | 90.6 | 92.5 | 93.5 | 85.1 | 90.8 | 88.6 |
| Specific viscosity | | 1.490 | 1.491 | 1.489 | 1.429 | 1.596 | 1.443 | 1.485 |

(*1) obtained by the method of preparation example 1
(*2) obtained by the method of preparation example 2
(*3) obtained by the method of preparation example 3
(*4) obtained by the method of preparation example 4
(*5) obtained by the method of preparation example 5
(*6) obtained by the method of preparation example 6
(*7) ash content ratio of layered phyllosilicate-containing polyester resin derived from layered phyllosilicate
(*8) ash content ratio of reinforced thermoplastic polyester resin composition derived from layered phyllosilicate and fibrous filler

EXAMPLE 19

A reinforced polyester resin composition was prepared in the same manner as in Example 18 except for using the layered phyllosilicate-containing polyester resin composition obtained in Preparation Example 2, and it was evaluated.

EXAMPLE 20

A reinforced polyester resin composition was prepared in the same manner as in Example 18 except for using the layered phyllosilicate-containing polyester resin composition obtained in Preparation Example 3, and it was evaluated.

EXAMPLE 21

A reinforced polyester resin composition was prepared in the same manner as in Example 18 except for using the layered phyllosilicate-containing polyester resin composition obtained in Preparation Example 4, and it was evaluated.

EXAMPLE 22

A reinforced polyester resin composition was prepared in the same manner as in Example 18 except for using the layered phyllosilicate-containing polyester resin composition obtained in Preparation Example 5, and it was evaluated.

EXAMPLE 23

A reinforced polyester resin composition was prepared in the same manner as in Example 18 except for using 250 g of S243 instead of T195H, and it was evaluated.

EXAMPLE 24

A reinforced polyester resin composition was prepared by melting and kneading 2,250 g of the layered phyllosilicate-containing polyester resin obtained in Preparation Example 6 and 250 g of T195H at pre-determined temperature of 230 to 250° C. under rotation speed of 100 rpm, and it was evaluated.

COMPARATIVE EXAMPLE 13

A reactor was charged with 3,500 g of BHET, and it was melted under a flow of dry nitrogen with stirring at 140° C. Then, temperature was gradually elevated, and 7.5 g of AO60 and 0.6 g of $Sb_2O_3$ were added thereto when it reached about 220 to 240° C. The temperature was further elevated to 280° C. Afterheating, the system was depressurized (0.5 to 5.0 torr) to polymerize a polyethylene terephthalate resin by melt-polycondensation. The obtained resin was evaluated. Results are shown in Table 10 (the same manner is also used through Comparative Examples 14 to 19)

TABLE 10

| | Com. Ex. No. | | | | | | |
|---|---|---|---|---|---|---|---|
| | 13 | 14 | 15 | 16 | 17 | 18 | 19 |
| Polyethylene terephthalate (g) | 2300 | 2100 | 2100 | 2100 | 2100 | | |
| Polybutylene terephthalate (g) | | | | | | 2300 | 2100 |
| Kunipia F (g) | | 170 | 170 | | 800 | | 170 |
| T195H (g) | | 250 | | 750 | 250 | | 250 |
| S243 (g) | | | 250 | | | | |
| Preparation method | | | | Melt polycondensation | | | |
| Logarithmic viscosity (g/dl) | 0.62 | 0.62 | 0.62 | 0.62 | 0.61 | 0.81 | 0.80 |
| Ash content ratio (% by weight) | 0.00 | 16.70 | 16.92 | 26.32 | 33.27 | 24.68 | 16.69 |
| Ratio of [D] ≦ 3000 Å (%) | Not Measured | 0 | 0 | Not measured | 0 | Not measured | 0 |
| Average value of [D] (Å) | | 165000 | 158000 | | 206000 | | 171000 |
| Number of dispersed particles [N] (number/% by weight · 100μ²) | | at most 1 | 3 | | at most 1 | | at most 1 |
| Average aspect ratio (*1) | | 1.5 | 1.5 | | 1.5 | | 1.5 |
| Average layer thickness (Å) (*2) | | 32000 | 32000 | | 54000 | | 33000 |
| Maximum layer thickness (Å) (*3) | | 905000 | 896000 | | 968000 | | 913000 |
| Flexural strength (MPa) | 104 | 113 | 125 | 154 | 145 | 85 | 121 |
| Flexural modulus (MPa) | 2970 | 5310 | 5920 | 8950 | 6350 | 2610 | 4960 |
| Heat deflection Temperature (° C.) | 88 | 210 | 218 | 232 | 215 | 82 | 198 |
| Warpage (mm) | Cannot be molded | 19.8 | 21.2 | 25.6 | 12.4 | 21.3 | 25.1 |
| Anisotropy (Coefficient of linear expansion MD/TD) | 0.61 | 0.16 | 0.19 | 0.13 | 0.46 | 0.48 | 0.19 |
| Gloss (%) | Not measured | 60.2 | 62.3 | 58.3 | 55.6 | 88.5 | 61.2 |
| Specific viscosity | 1.365 | 1.491 | 1.443 | 1.599 | 1.704 | 1.311 | 1.446 |

(*1): not dispersed in the state of plate; indicated by ratio of long diameter to short diameter of dispersion particles
(*2): not dispersed in the state of plate; indicated by number average of short diameter of dispersion particles
(*3): not dispersed in the state of plate; indicated by the maximum of short diameter of dispersion particles

COMPARATIVE EXAMPLE 14

In the same manner as in Example 18, 2,100 g of the polyethylene terephthalate resin polymerized by the same method as in Comparative Example 13, 250 g of T195H, 170 g of Kunipia F and 6.3 g of AO60 were melted and kneaded, and the obtained resin was evaluated.

It was found that only rough and large Kunipia F particles some μm in size were dispersed and dimensional accuracy such as warpage or anisotropy was never improved only by directly kneading Kunipia F.

COMPARATIVE EXAMPLE 15

A resin composition was prepared in the same manner as in Comparative Example 14 except for using S243 instead of T195H, and it was evaluated.

It was found that only rough and large Kunipia F particles some μm in size were dispersed and dimensional accuracy such as warpage or anisotropy was never improved only by directly kneading Kunipia F.

COMPARATIVE EXAMPLE 16

In the same manner as in Example 18, 2,100 g of the polyethylene terephthalate resin polymerized by the same method as in Comparative Example 13, 750 g of T195H and 6.3 g of AO60 were melted and mixed, and the obtained resin was evaluated.

It was found that though flexural properties and heat resistance were improved due to glass fiber contained in a considerable amount, dimensional accuracy such as warpage or anisotropy, and surface gloss were remarkably deteriorated.

COMPARATIVE EXAMPLE 17

A resin composition was prepared in the same manner as in Comparative Example 14 except that the amount of Kunipia F was changed to 800 g, and it was evaluated. Increase of the amount of Kunipia F does not bring about sufficient improvement effect on warpage or anisotropy since the particles remains as large as some μm. Also, improvement effect on flexural properties is not sufficient. On the contrary, specific gravity was increased and surface gloss was lost, because the amount of Kunipia F was increased.

COMPARATIVE EXAMPLE 18

A reactor was charged with 2,300 g of DMT, 1,500 g of 1,4-BD, 7.0 g of AO60 and 0.60 g of Ti(OBu)$_4$. By transesterification of DMT and 1,4-BD with stirring the mixture at reaction temperature of about 160 to 190° C. for about three hours, the temperature of the system was elevated gradually to 270° C. Afterheating, it was depressurized (0.5 to 5.0 torr) followed by melt-polycondensation, and then a polybutylene terephthalate resin was obtained and evaluated.

COMPARATIVE EXAMPLE 19

In the same manner as in Example 24, 2,100 g of the polybutylene terephthalate polymerized by the same method as in Comparative Example 18, 250 g of T195H, 170 g of Kunipia F and 6.3 g of AO60 were mixed and kneaded, and the obtained resin was evaluated. Similarly to Comparative Example 14, it was found that only rough and large Kunipia F particles some μm in size were dispersed and dimensional accuracy such as warpage or anisotropy was never improved only by directly kneading Kunipia F.

COMPARATIVE EXAMPLE 20

By using a wet mill, 3,500 g of ion exchange water and 185 g of montmorillonite were mixed (at 5,000 rpm for five minutes). Thereafter, thereto was added 18 g of γ-(2-aminoethyl)aminopropyl trimethoxysilane (A-1120 available from Nippon Unicar Co., Ltd.), and it was further stirred for two hours to prepare a dispersion. Next, following addition of 3,000 g of BHET thereto, water was removed therefrom, 7.0 g of AO60 and 0.6 g of $Sb_2O_3$ were added thereto, and then the temperature was further elevated to 280° C. Afterheating, the system was depressurized (0.5 to 5.0 torr) and melt-polycondensation was performed to obtain a resin composition. A reinforced polyester resin composition was prepared by melting and kneading 2,250 g of the obtained resin composition and 250 g of T195H in the same manner as in Example 18, and color tone was visually evaluated. The specimen remarkably took on brown because a silane compound was used in Comparative Example 20. On the other hand, no such coloration was observed in the specimens of Examples 18 to 24 when color tone was evaluated visually.

PREPARATION EXAMPLE 7

A dispersion of layered phyllosilicate and water was prepared by stirring and mixing 2,300 g of ion exchange water and 220 g of Bengel HVP according to a wet mill (made by Nippon Seiki Co. Ltd.) at 5,000 rpm for 20 minutes.

A reactor was charged with 1,600 g of BHET, and it was melted under a flow of dry nitrogen with stirring at 140° C. Next, BHET and a dispersion of layered phyllosilicate and water were mixed by gradually adding the dispersion of layered phyllosilicate and water with keeping the system at 130 to 180° C. and stirring at 150 to 200 rpm. The rate of addition was about 1,700 g/hour. Vaporized water was released outside the system.

After completing addition of the dispersion of layered phyllosilicate and water, temperature of the system was elevated gradually. When the temperature reached about 220 to 240° C. and about 70 to 80% of water in the added dispersion of layered phyllosilicate and water was confirmed to be released outside the system, 3.0 g of a hindered phenol stabilizer (ADK STAB AO60 available from Asahi Denka Kogyo K.K., hereinafter referred to as AO 60) and 0.3 g of antimony trioxide ($Sb_2O_3$) were added thereto, and the temperature of the system was further elevated to 280° C. Afterheating, the system was depressurized (0.5 to 5.0 torr) and melt-polycondensation was performed to prepare layered phyllosilicate-containing polyester resin A. The amounts of materials are shown in Table 11 (the same manner is also used through Preparation Examples 8 to 13).

PREPARATION EXAMPLE 8

A layered phyllosilicate-containing polyester resin B was prepared in the same manner as in Preparation Example 7 except for changing the amount of BHET to 1,200 g, the amount of AO60 to 2.3 g and the amount of $Sb_2O_3$ to 0.23 g.

PREPARATION EXAMPLE 9

A layered phyllosilicate-containing polyester resin C was prepared in the same manner as in Preparation Example 7 except for changing the amount of BHET to 800 g, the amount of AO60 to 1.5 g and the amount of $Sb_2O_3$ to 0.15 g.

PREPARATION EXAMPLE 10

A dispersion of layered phyllosilicate and water was prepared by stirring and mixing a mixed solvent of 1,700 g of ion exchange water and 600 g of ethylene glycol with 220 g of Bengel HVP according to a wet mill at 5,000 rpm for 30 minutes.

A layered phyllosilicate-containing polyester resin D was prepared in the same manner as in Preparation Example 8 except for adding the above dispersion of layered phyllosilicate and water at a rate of 2,100 g/hour.

PREPARATION EXAMPLE 11

A dispersion of layered phyllosilicate and water containing about 6.5% by weight of Kunipia F was prepared by stirring and mixing 3,400 g of ion exchange water and 220 g of Kunipia F at 5,000 rpm for 30 minutes by using a high-speed stirring homogenizer (made by Nippon Seiki Co., Ltd.).

A layered phyllosilicate-containing polyester resin E was prepared in the same manner as in Preparation Example 8 except for adding the above dispersion of layered phyllosilicate and water at a rate of 2,000 g/hour.

PREPARATION EXAMPLE 12

A layered phyllosilicate-containing polyester resin F was prepared in the same manner as in Preparation Example 8 except for using 220 g of ME100 instead of Bengel HVP.

PREPARATION EXAMPLE 13

A dispersion of layered phyllosilicate and water was prepared in the same manner as in Example 25.

Bismethyl carbonate of BPA was prepared by adding, in an autoclave, 1,890 g of BPA, 1,680 g of DMC and 16 g of dibutyltin oxide, and allowing it to reaction by bubbling with dry nitrogen gas at 160° C. under pressure of 7 $kg/cm_2$. Next, the bismethyl carbonate of BPA was mixed with the dispersion of layered phyllosilicate and water by gradually adding the above dispersion of layered phyllosilicate and water with vigorously stirring at 180 rpm. The rate of addition was about 1,400 g/hour. Vaporized water was released outside the system.

Then layered phyllosilicate-containing polycarbonate resin G was prepared by melt-polycondensation at reaction temperature of 230 to 240° C. with pressure of at most 1 torr.

TABLE 11

|  | Preparation Ex. No. | | | | | | |
| --- | --- | --- | --- | --- | --- | --- | --- |
|  | 7 | 8 | 9 | 10 | 11 | 12 | 13 |
| Ion exchange water (g) | 2300 | 2300 | 2300 | 1700 | 3400 | 2300 | 2300 |
| Ethylene glycol (g) |  |  |  | 600 |  |  |  |
| Bengel HVP (g) | 220 | 220 | 220 | 220 |  |  | 220 |
| Kunipia F (g) |  |  |  |  | 220 |  |  |
| ME100 (g) |  |  |  |  |  | 220 |  |
| BHET (g) (*1) | 1600 | 1200 | 800 | 1200 | 1200 | 1200 |  |
| DMC (g) (*2) |  |  |  |  |  |  | 1680 |
| BPA (g) (*3) |  |  |  |  |  |  | 1890 |
| Ash content ratio (% by weight) | 15.21 | 19.23 | 26.37 | 19.16 | 19.08 | 19.28 | 9.56 |

(*1) BHET: Bishydroxyethyl terephthalate
(*2) DMC: Dimethyl carbonate
(*3) BPA: Bisphenol-A

EXAMPLE 25

A thermoplastic resin composition was prepared by dry lending 1,350 g of the layered phyllosilicate-containing polyester resin prepared in Preparation Example 7, 1,720 g of A2200, 5.0 g of phosphorous stabilizer (ADK STAB HP10 available from Asahi Denka Kogyo K.K., hereinafter referred to as HP 10) and 5.0 g of AO 60, and then melting and kneading the same under conditions of reaction temperature of 260 to 280° C. and rotation speed of 100 rpm by using a twin-screw extruder (LOBOTEX 30 made by The Japan Steel Works, Ltd.). Then it was evaluated. Results are shown in Table 12 (the same manner is also used through Examples 26 to 31).

EXAMPLE 26

A thermoplastic resin composition was prepared in the same manner as in Example 25 except for using the layered phyllosilicate-containing polyester resin obtained in Preparation Example 8, and it was evaluated.

EXAMPLE 27

A thermoplastic resin composition was prepared in the same manner as in Example 25 except for using the layered phyllosilicate-containing polyester resin obtained in Preparation Example 9, and it was evaluated.

EXAMPLE 28

A thermoplastic resin composition was prepared in the same manner as in Example 25 except for using the layered phyllosilicate-containing polyester resin obtained in Preparation Example 10, and it was evaluated.

EXAMPLE 29

A thermoplastic resin composition was prepared in the same manner as in Example 25 except for using the layered phyllosilicate-containing polyester resin obtained in Preparation Example 11, and it was evaluated.

EXAMPLE 30

A thermoplastic resin composition was prepared in the same manner as in Example 25 except for using the layered phyllosilicate-containing polyester resin obtained in Preparation Example 12, and it was evaluated.

EXAMPLE 31

A thermoplastic resin composition was prepared in the same manner as in Example 25 except for dry-blending 2,200 g of the layered phyllosilicate-containing polycarbonate resin prepared in Preparation Example 13, 850 g of PBK 2, 5.0 g of HP10 and 5.0 g of AO60. And it was evaluated.

TABLE 12

|  |  | Ex. No. | | | | | | |
| --- | --- | --- | --- | --- | --- | --- | --- | --- |
|  |  | 25 | 26 | 27 | 28 | 29 | 30 | 31 |
| Polyester resin containing layered phyllosilicate | A (g) (*1) | 1350 |  |  |  |  |  |  |
|  | B (g) (*2) |  | 1100 |  |  |  |  |  |
|  | C (g) (*3) |  |  | 810 |  |  |  |  |
|  | D (g) (*4) |  |  |  | 1100 |  |  |  |
|  | E (g) (*5) |  |  |  |  | 1100 |  |  |
|  | F (g) (*6) |  |  |  |  |  | 1100 |  |
| Polycarbonate resin G containing layered phyllosilicate (g) (*7) |  |  |  |  |  |  |  | 2200 |
| PET resin (g) |  |  |  |  |  |  |  | 850 |
| PC resin (g) |  | 1720 | 2080 | 2380 | 2080 | 2080 | 2080 |  |
| HP10 (g) |  | 5.0 | 5.0 | 5.0 | 5.0 | 5.0 | 5.0 | 5.0 |

TABLE 12-continued

|  | Ex. No. | | | | | | |
| --- | --- | --- | --- | --- | --- | --- | --- |
|  | 25 | 26 | 27 | 28 | 29 | 30 | 31 |
| AO60 (g) | 5.0 | 5.0 | 5.0 | 5.0 | 5.0 | 5.0 | 5.0 |
| Ash content ratio (% by weight) | 6.68 | 6.65 | 6.71 | 6.62 | 6.61 | 6.71 | 6.82 |
| Ratio of [D] ≦ 3000 Å (%) | 91 | 90 | 81 | 92 | 88 | 90 | 86 |
| Average value of [D] (Å) | 1080 | 1120 | 1440 | 1050 | 850 | 1080 | 1110 |
| Number of dispersed particles [N] (number/% by weight · 100μ²) | 135 | 124 | 210 | 137 | 198 | 130 | 140 |
| Average aspect ratio | 146 | 127 | 103 | 142 | 97 | 145 | 145 |
| Average layer thickness (Å) | 74 | 94 | 60 | 76 | 65 | 75 | 76 |
| Maximum layer thickness (Å) | 300 | 380 | 250 | 310 | 290 | 300 | 310 |
| Flexural strength (MPa) | 139 | 132 | 131 | 116 | 135 | 135 | 129 |
| Flexural modulus (MPa) | 5160 | 4980 | 4670 | 4390 | 5060 | 5020 | 4860 |
| Heat deflection Temperature (° C.) | 147 | 151 | 156 | 144 | 152 | 151 | 152 |
| Warpage (mm) | <0.1 | <0.1 | <0.1 | 0.3 | <0.1 | <0.1 | <0.1 |
| Center line roughness (nm) | 20 | 20 | 20 | 52 | 22 | 32 | 22 |

(*1) layered phyllosilicate-containing polyester resin obtained by the method of preparation example 7
(*2) layered phyllosilicate-containing polyester resin obtained by the method of preparation example 8
(*3) layered phyllosilicate-containing polyester resin obtained by the method of preparation example 9
(*4) layered phyllosilicate-containing polyester resin obtained by the method of preparation example 10
(*5) layered phyllosilicate-containing polyester resin obtained by the method of preparation example 11
(*6) layered phyllosilicate-containing polyester resin obtained by the method of preparation example 12
(*7) layered phyllosilicate-containing polycarbonate resin obtained by the method of preparation example 13

COMPARATIVE EXAMPLE 21

Dry-blending of 900 g of PBK 2, 2,100 g of A2200, 6.0 g of HP10 and 6.0 g of AO60 was performed, and the mixture was melted and kneaded in the same manner as in Example 25. Then it was evaluated. Results are shown in Table 13 (the same manner is also used through Comparative Examples 22 to 25).

COMPARATIVE EXAMPLE 22

Dry-blending of 900 g of PBK 2, 2,100 g of A2200, 220 g of Kunipia F, 6.0 g of HP10 and 6.0 g of AO60 was performed, and the mixture was melted and kneaded in the same manner as in Example 25. Then it was evaluated. It was found that only rough and large Kunipia F particles some μm in size were dispersed and dimensional accuracy such as warpage or anisotropy was never improved only by directly kneading Kunipia F directly.

COMPARATIVE EXAMPLE 23

By applying supersonic wave, 660 g of ion exchange water was mixed with 220 g of Kunipia F to swell Kunipia F with ion exchange water.

A twin-screw extruder (TEX 44 made by The Japan Steel Works, Ltd.) was used to melt and knead 900 g of PBK2, 2,100 g of A2200, 6.0 g of HP10, 6.0 g of AO60 and the above Kunipia F swelled by using ion exchange water, under conditions of 250 to 280° C. and rotation speed of 350 rpm. Vaporized water was removed under reduced pressure through a vent.

COMPARATIVE EXAMPLE 24

Although 900 g of PBK2, 2,100 g of A2200, 6.0 g of HP10, 6.0 g of AO60 and 3.0 g a carboxylate salt nuclear agent (sodium montanate) were melted and kneaded in the same manner as in Example 25, evaluation was impossible due to foaming.

COMPARATIVE EXAMPLE 25

Dry-blending of 900 g of PBK 2, 2,100 g of A2200, 420 g of glass fiber (T195H), 6.0 g of HP10 and 6.0 g of AO60 was performed, and the mixture was melted and kneaded in the same manner as in Example 25. Dimensional accuracy and surface appearance were particularly damaged, though mechanical properties and heat resistance showed some improvements by means of glass fiber.

TABLE 13

|  | Com. Ex. No. | | | | |
| --- | --- | --- | --- | --- | --- |
|  | 21 | 22 | 23 | 24 | 25 |
| PET resin (g) | 900 | 900 | 900 | 900 | 900 |
| PC resin (g) | 2100 | 2100 | 2100 | 2100 | 2100 |
| Ion exchange water (g) |  |  | 660 |  |  |
| Kunipia F (g) |  | 220 | 220 |  |  |
| Sodium montanate (g) |  |  |  | 3.0 |  |
| Glass fiber (g) |  |  |  |  | 420 |
| HP10 (g) | 6.0 | 6.0 | 6.0 | 6.0 | 6.0 |
| AO60 | 6.0 | 6.0 | 6.0 | 6.0 | 6.0 |
| Ash content ratio (% by weight) | 0.00 | 6.72 | 6.57 | 0.00 | 12.30 |
| Ratio of [D] ≦ 3000 Å (%) |  | 0 | 0 |  |  |
| Average value of [D] (Å) |  | 26500 | 12400 |  |  |

TABLE 13-continued

| | Com. Ex. No. | | | | |
|---|---|---|---|---|---|
| | 21 | 22 | 23 | 24 | 25 |
| Number of dispersed particles [N] (number/% by weight · 100μ²) | Not measured | 1 | 12 | Resin composition was not obtained due to foaming | Not measured |
| Average aspect ratio (*1) | | 1.5 | 2.8 | | |
| Average layer thickness (Å) (*2) | | 32000 | 5900 | | |
| Maximum layer thickness (Å) (*3) | | 900000 | 10700 | | |
| Flexural strength (MPa) | 97 | 102 | 100 | Resin composition | 135 |
| Flexural modulus (MPa) | 2450 | 2490 | 2460 | was not obtained | 5060 |
| Heat deflection Temperature (° C.) | 108 | 110 | 108 | due to foaming | 175 |
| Warpage (mm) | <0.1 | <0.1 | <0.1 | | 12.6 |
| Center line roughness (nm) | 20 | 766 | 588 | | 1520 |

(*1): not dispersed in the state of plate; indicated by average value of long diameter/ short diameter of dispersion particles
(*2): not dispersed in the state of plate; indicated by number average of short diameter of dispersion particles
(*3): not dispersed in the state of plate; indicated by the maximum of short diameter of dispersion particles

INDUSTRIAL APPLICABILITY

In a thermoplastic polyester resin, modulus of elastisity, heat resistance, dimensional stability and moldability can be improved without losing surface smoothness by separating and exfoliating each unit layer of layered phyllosilicate to divide one coagulated particle of the layered phyllosilicate into numerous, extremely fine and thin platelets and by dispersing the same uniformly.

In addition, since it is not necessary to treat layered phyllosilicate with a finishing agent or a swelling agent, there is no harmful effect such as deterioration, coloring and lowering of thermal stability in a resin due to any finishing agent or swelling agent in the present invention. Uniform dispersion of finely pulverized layered phyllosilicate in this way can be described by product $J_{e0}\eta_0$ of equilibrium compliance by zero shear viscosity, difference $\eta_e-3\eta$ between extensional viscosity, and shear viscosity and difference $\Delta\eta_e$ between extensional viscosity values measured under different shear rate.

By containing fibrous filler and micro-thin-plate layered phyllosilicate dispersed uniformly in considerably large amount in a thermoplastic polyester resin, dimensional accuracy such as warpage oranisotropy can be improved in smaller amount than conventional method. Since effects can be revealed by small amount, another characteristics can be also imparted such that specific gravity can be prevented from increasing and that appearance and mechanical properties of molded articles are not to be impaired.

By separating and exfoliating each unit layer of layered phyllosilicate to divide one coagulated particle of layered phyllosilicate into numerous, extremely fine laminar particles and by dispersing the same in a resin composition containing a thermoplastic polyester resin or a thermoplastic polycarbonate resin uniformly, it is possible to improve mechanical properties and heat resistance without losing surface properties and dimensional accuracy of the resin composition.

The invention claimed is:

1. A process for producing a polyester resin composition containing a thermoplastic polyester resin and layered phyllosilicate consisting of untreated phyllosilicate comprising:
    (A) a step for preparing a dispersion of layered phyllosilicate and water containing layered phyllosilicate and water;
    (B) a step for adding said dispersion of layered phyllosilicate, in an amount from 0.1 to 45 parts by weight of layered phyllosilicate based on 100 parts by weight of the thermoplastic resin, and water continuously or successively to a component having low polymerization degree of the thermoplastic polyester resin at a rate of 0.01 to 10.0 parts by weight per minute based on 100 parts by weight of the component having low polymerization degree of the thermoplastic polyester resin; and
    (C) a step for polymerizing the thermoplastic polyester resin.

* * * * *